United States Patent
Mistry et al.

(10) Patent No.: US 12,188,406 B2
(45) Date of Patent: Jan. 7, 2025

(54) AXIAL-CENTRIFUGAL CONTRA-ROTATING LIGHT WEIGHT, COMPACT COMPRESSION SYSTEM

(71) Applicant: INDIAN INSTITUTE OF TECHNOLOGY, KHARAGPUR, West Bengal (IN)

(72) Inventors: Chetankumar Sureshbhai Mistry, West Bengal (IN); Akchhay Kumar, West Bengal (IN)

(73) Assignee: INDIAN INSTITUTE OF TECHNOLOGY, KHARAGPUR, West Bengal (IN)

( * ) Notice: Subject to any disclaimer, the term of this patent is extended or adjusted under 35 U.S.C. 154(b) by 65 days.

(21) Appl. No.: 18/248,998

(22) PCT Filed: Oct. 19, 2021

(86) PCT No.: PCT/IN2021/050994
§ 371 (c)(1),
(2) Date: Apr. 13, 2023

(87) PCT Pub. No.: WO2022/085024
PCT Pub. Date: Apr. 28, 2022

(65) Prior Publication Data
US 2023/0392546 A1 Dec. 7, 2023

(30) Foreign Application Priority Data
Oct. 22, 2020 (IN) .............................. 202031045996

(51) Int. Cl.
*F02C 3/08* (2006.01)
*F04D 1/06* (2006.01)
*F04D 3/00* (2006.01)

(52) U.S. Cl.
CPC .................. *F02C 3/08* (2013.01); *F04D 1/06* (2013.01); *F04D 3/00* (2013.01)

(58) Field of Classification Search
CPC .... F04D 19/024; F04D 17/025; F04D 19/028; F04D 19/026; F02C 3/08
See application file for complete search history.

(56) References Cited

U.S. PATENT DOCUMENTS 3,546,880 A * 12/1970 Schwaar ................. F04D 21/00
 417/205
10,677,159 B2 * 6/2020 Smith ....................... F02C 7/36
(Continued)

*Primary Examiner* — Eldon T Brockman
(74) *Attorney, Agent, or Firm* — D'Ambrosio & Menon, PLLC; Usha Menon

(57) ABSTRACT

The present invention is directed to axial-centrifugal contra-rotating compressor system comprising combination of contra-rotating axial compressor stage with a back end centrifugal compressor stage, eliminating stator blades, an interstage connecting duct at the entry of the centrifugal compressor and an discharge 5 diffuser at the exit of centrifugal compressor rotor characterized by radial to axial turning annular passage as per the gas turbine engine requirement, favouring reduction in engine size, weight, number of parts, overall engine length and produces a higher-pressure rise and swirl-free discharge towards the combustion chamber. The first low-pressure rotor having at least one axial blading assembly 10 rotates in the direction opposite to the second high-pressure rotor blading assembly comprising of at least one axial rotor and one centrifugal rotor. The blades for axial compressor are adopted of low-aspect ratio configuration for reliable high load stall free operation. The inter-stage connecting duct minimizes total pressure loss. The discharge diffuser recovers higher exit velocity and hence 15 higher kinetic energy.

18 Claims, 15 Drawing Sheets

Schematic of Axial-Centrifugal Contra rotating Compressor

(56) References Cited

U.S. PATENT DOCUMENTS

Figure 1A:
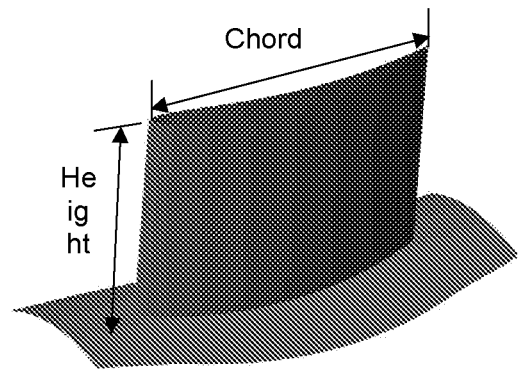

2018/0355791 A1 12/2018 Nolcheff et al.
2019/0128181 A1 5/2019 Smith

* cited by examiner

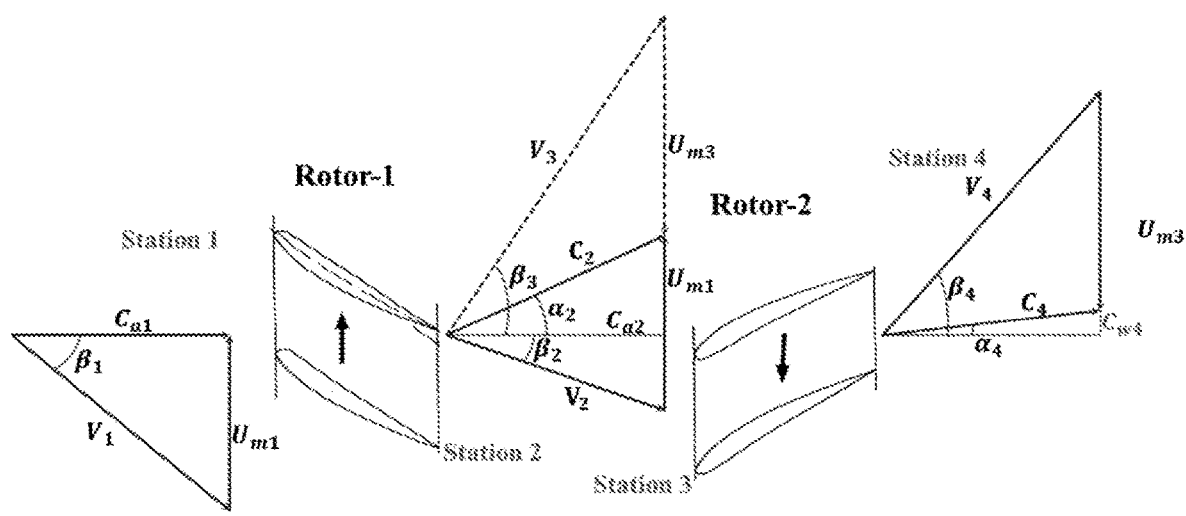
Figure 1(d). Velocity Triangle of rotor-1 and rotor-2 representations

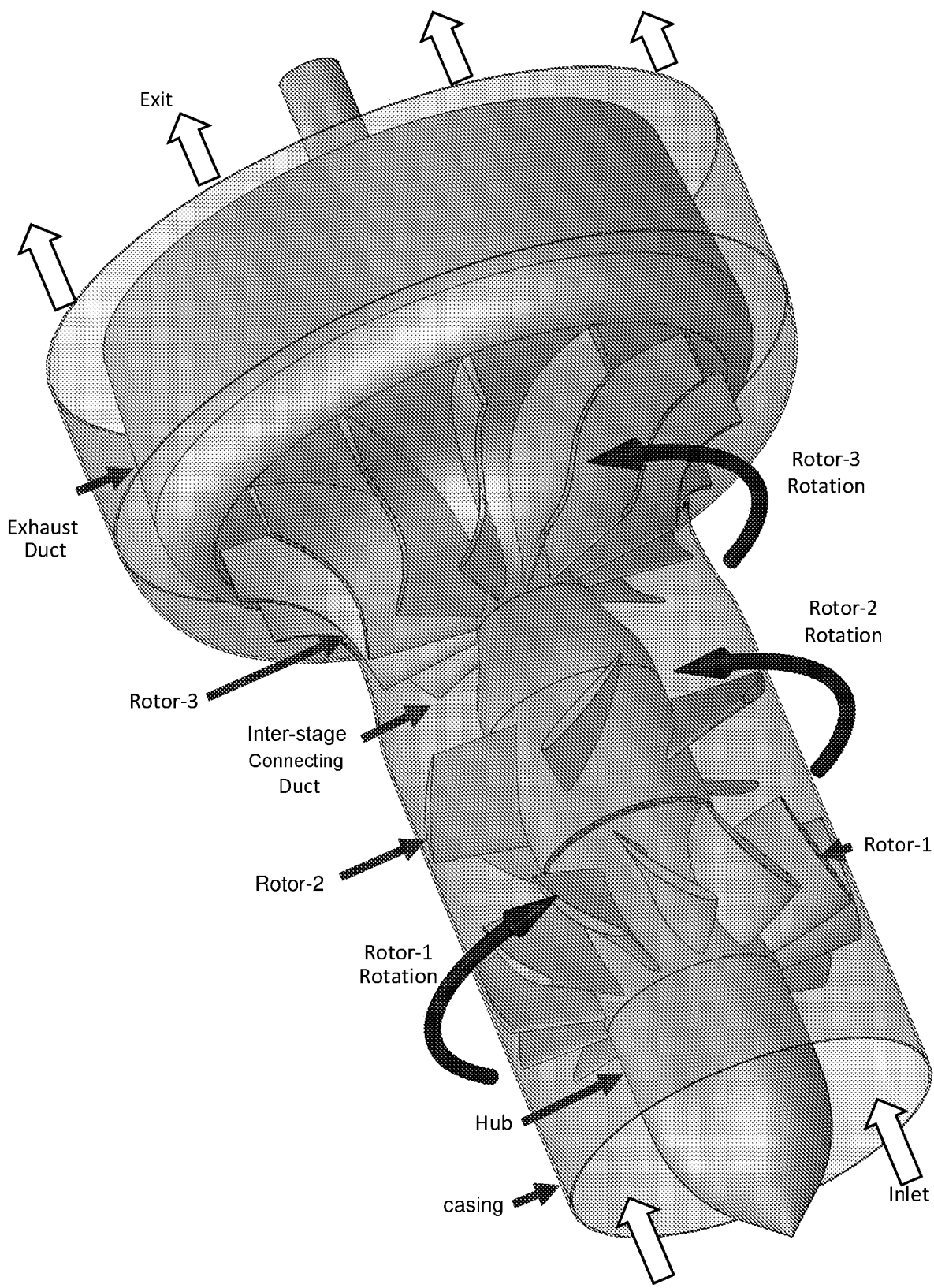
Figure 2. Schematic of the newly proposed configuration of axial-centrifugal contra-rotating compressor showing main components

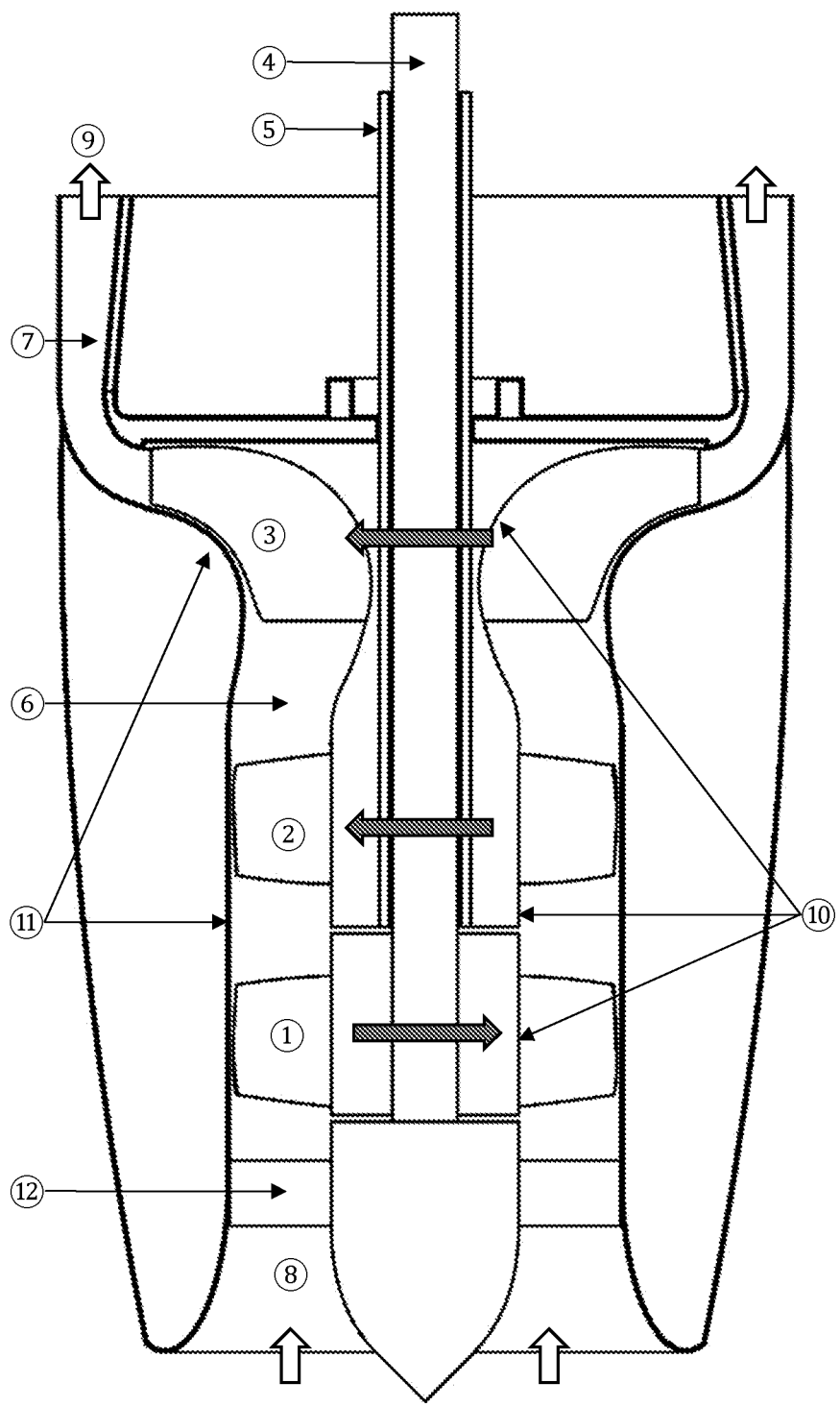
Figure 3 Schematic of Axial-Centrifugal Contra rotating Compressor

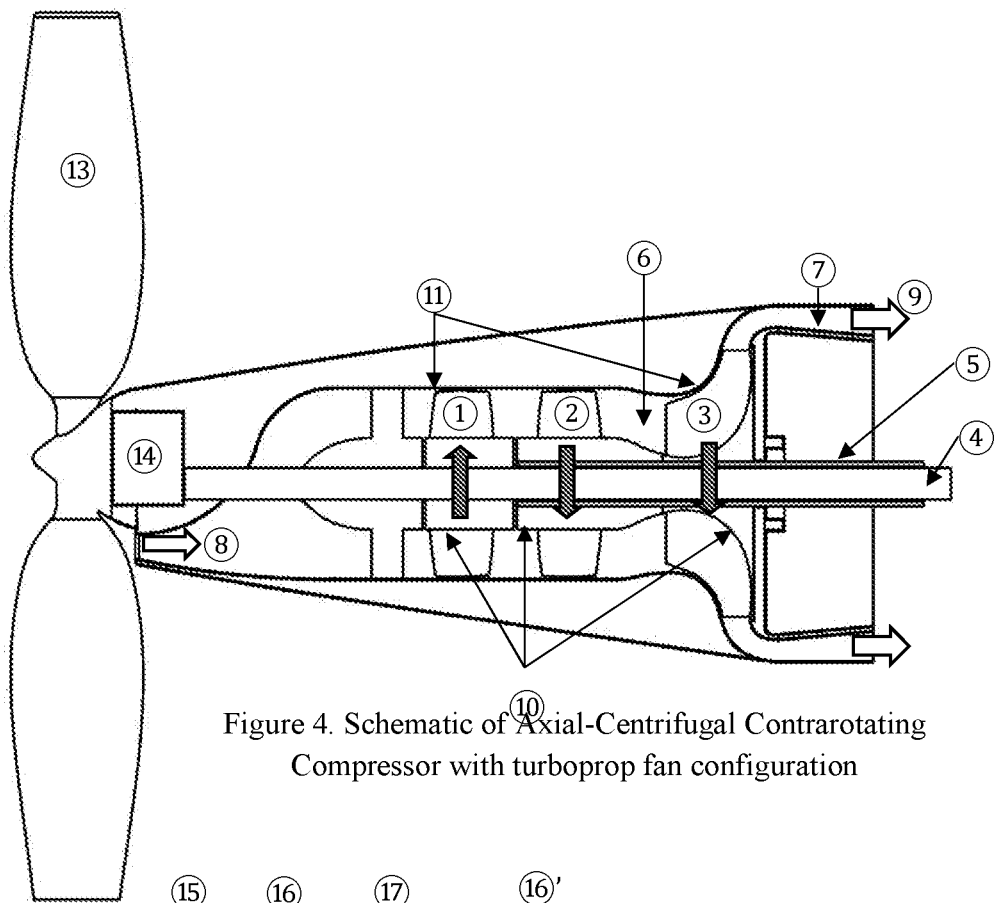
Figure 4. Schematic of Axial-Centrifugal Contrarotating Compressor with turboprop fan configuration
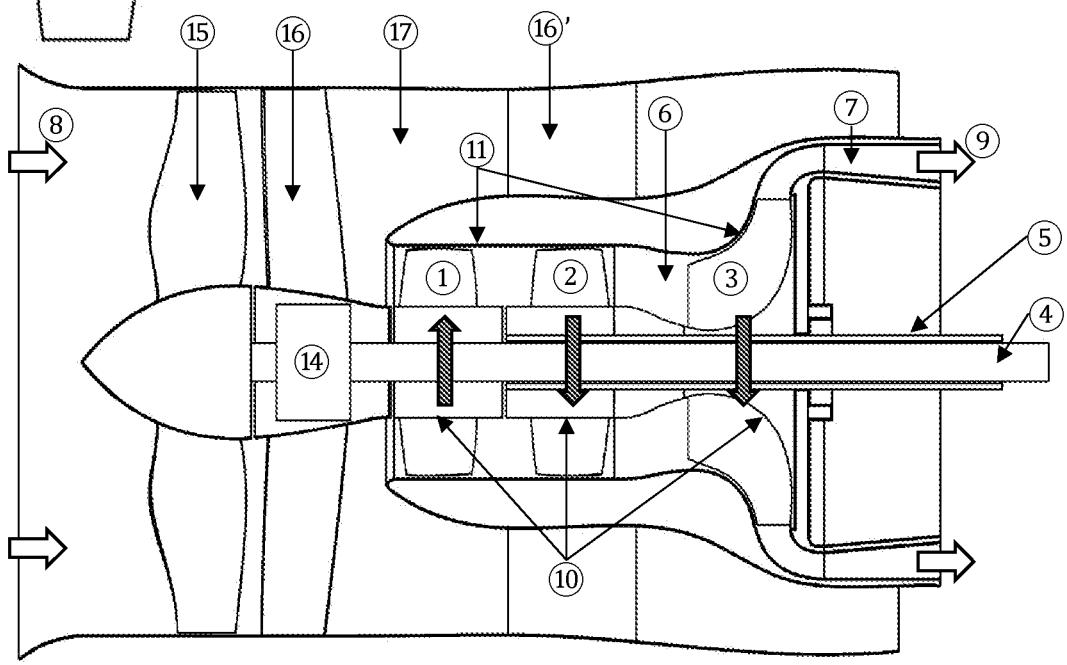
Figure 5. Schematic of Axial-Centrifugal Contrarotating Compressor with turbofan configuration

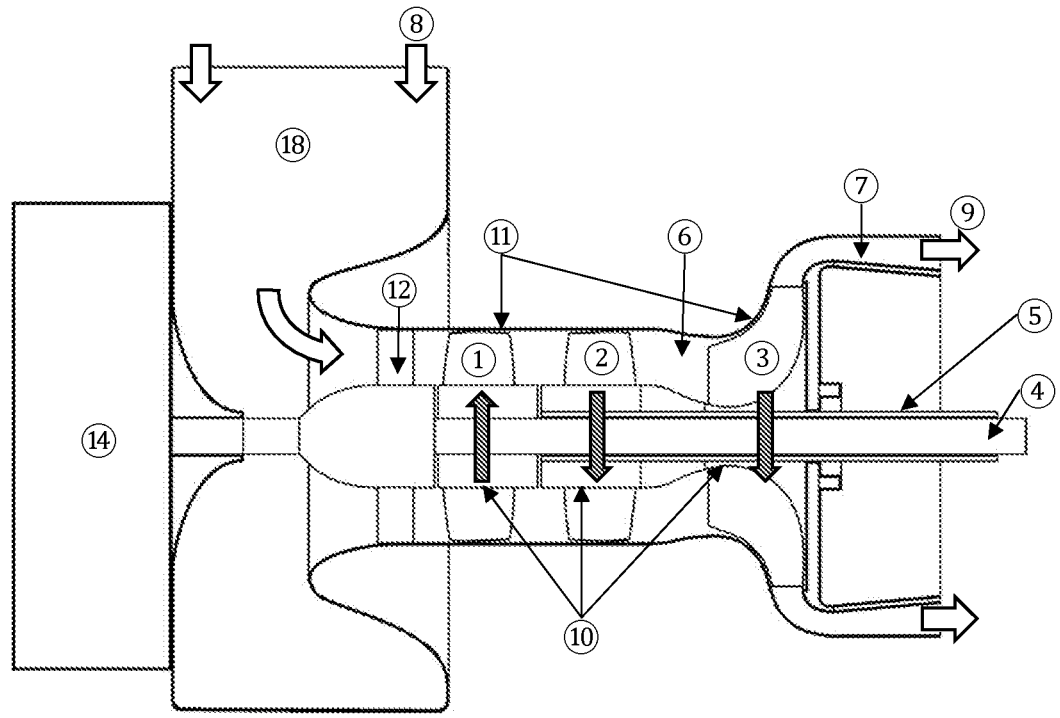
Figure 6. Schematic of Axial-Centrifugal Contrarotating Compressor with volute Inlet plenum
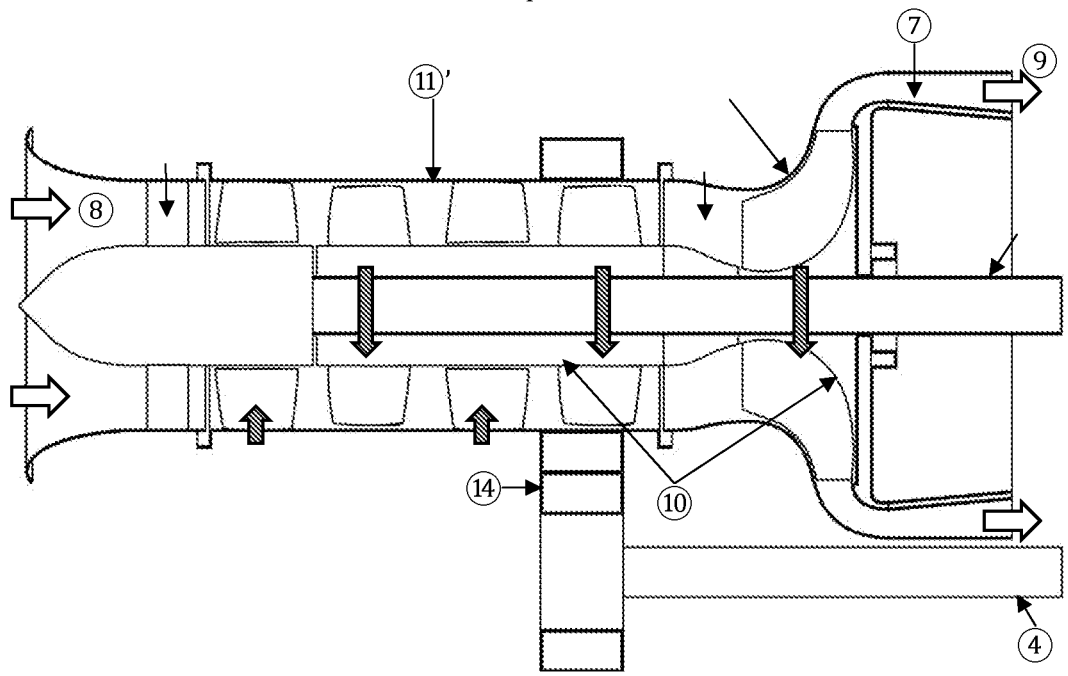
Figure 7. Schematic of Axial-Centrifugal Contrarotating Compressor having axial inlet with multiple rotors. Here, one rotor blade row mounted on rotating casing

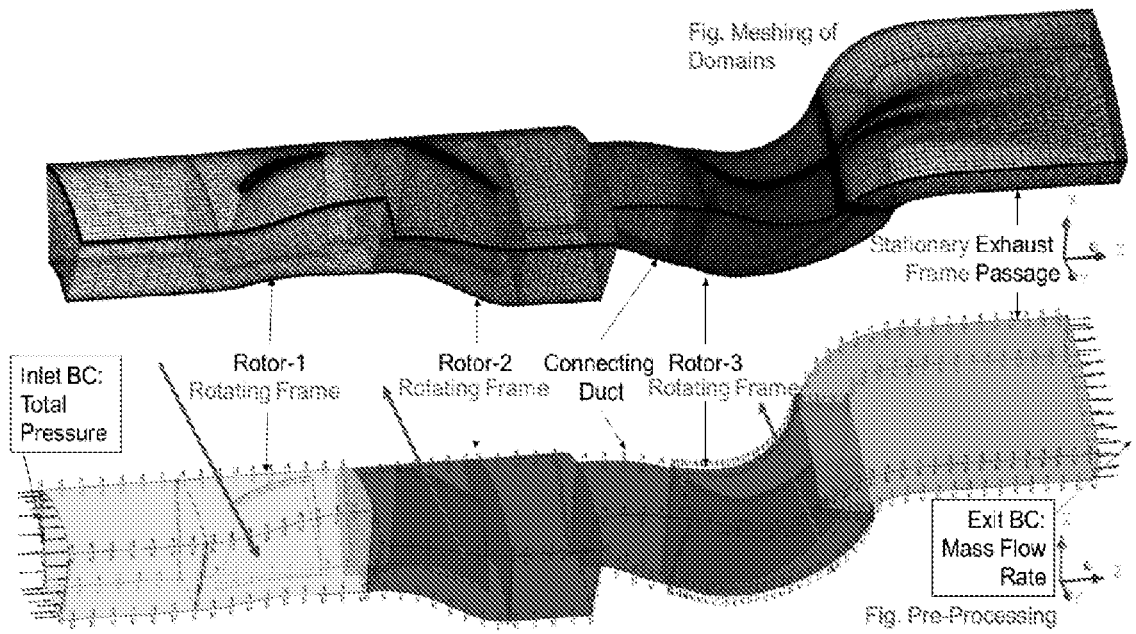
Figure 13
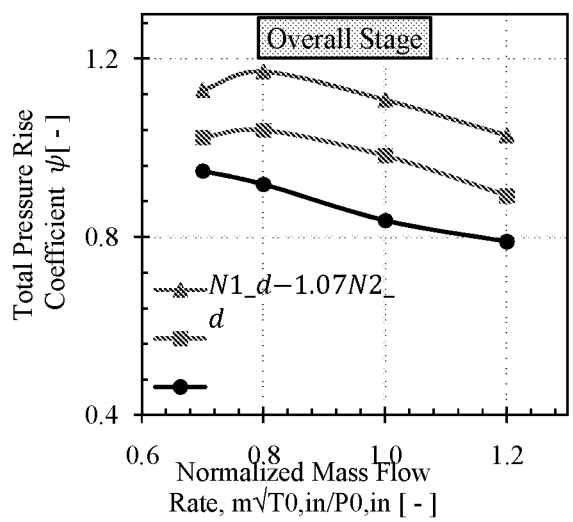
Figure 14. performance characteristics in terms of normalized total pressure rise coefficient $\psi$ and normalized mass flow rate $m\sqrt{T_{0,IN}}/P_{0,IN}$ for the overall stage

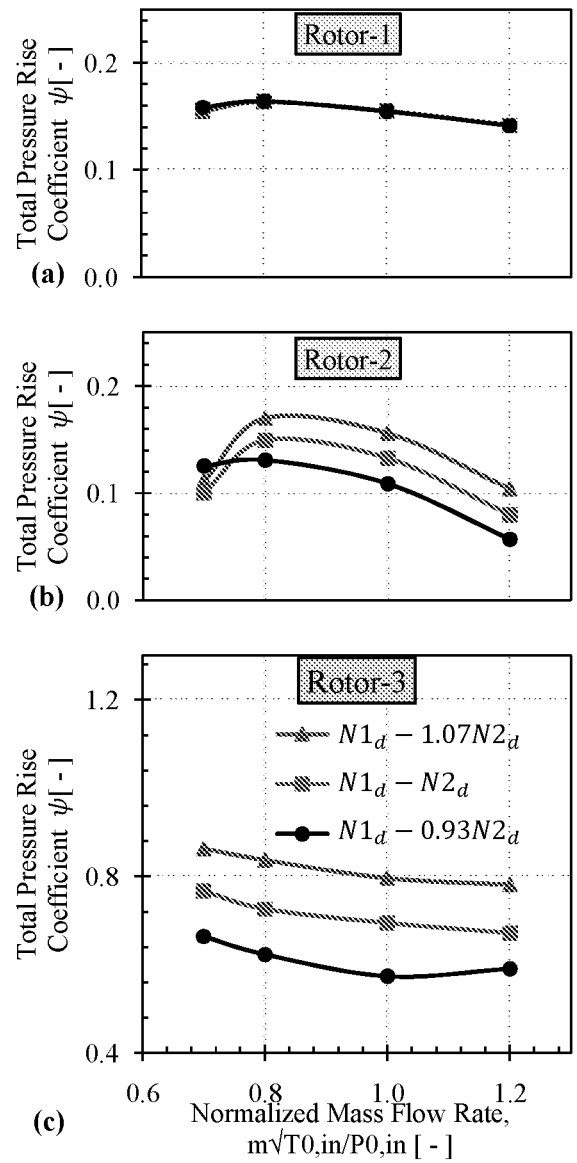
Figure 15. performance characteristics in terms of normalized total pressure rise coefficient $\psi$ and normalized mass flow rate $m\sqrt{T_{0,IN}}/P_{0,IN}$ (a) for the rotor-1, (b) for the rotor-2, and (c) for the rotor-3

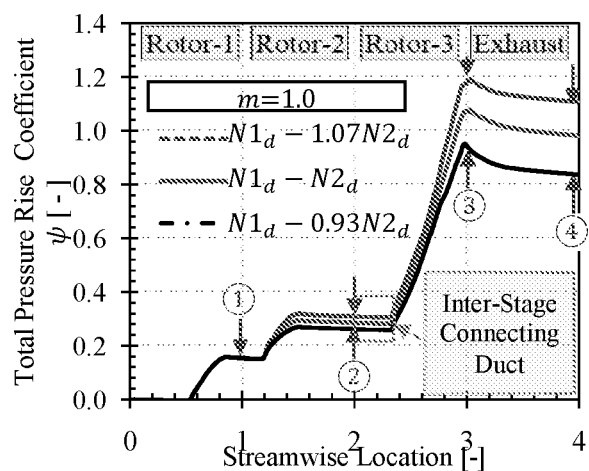
Figure 16. the variation of Total Pressure Rise Coefficient $\psi$ along the streamwise locations at mass flow rate, $m = 1.0$ and speed combinations $N1_d - 0.93N2_d, N1_d - N2_d$ and $N1_d - 1.07N2_d$

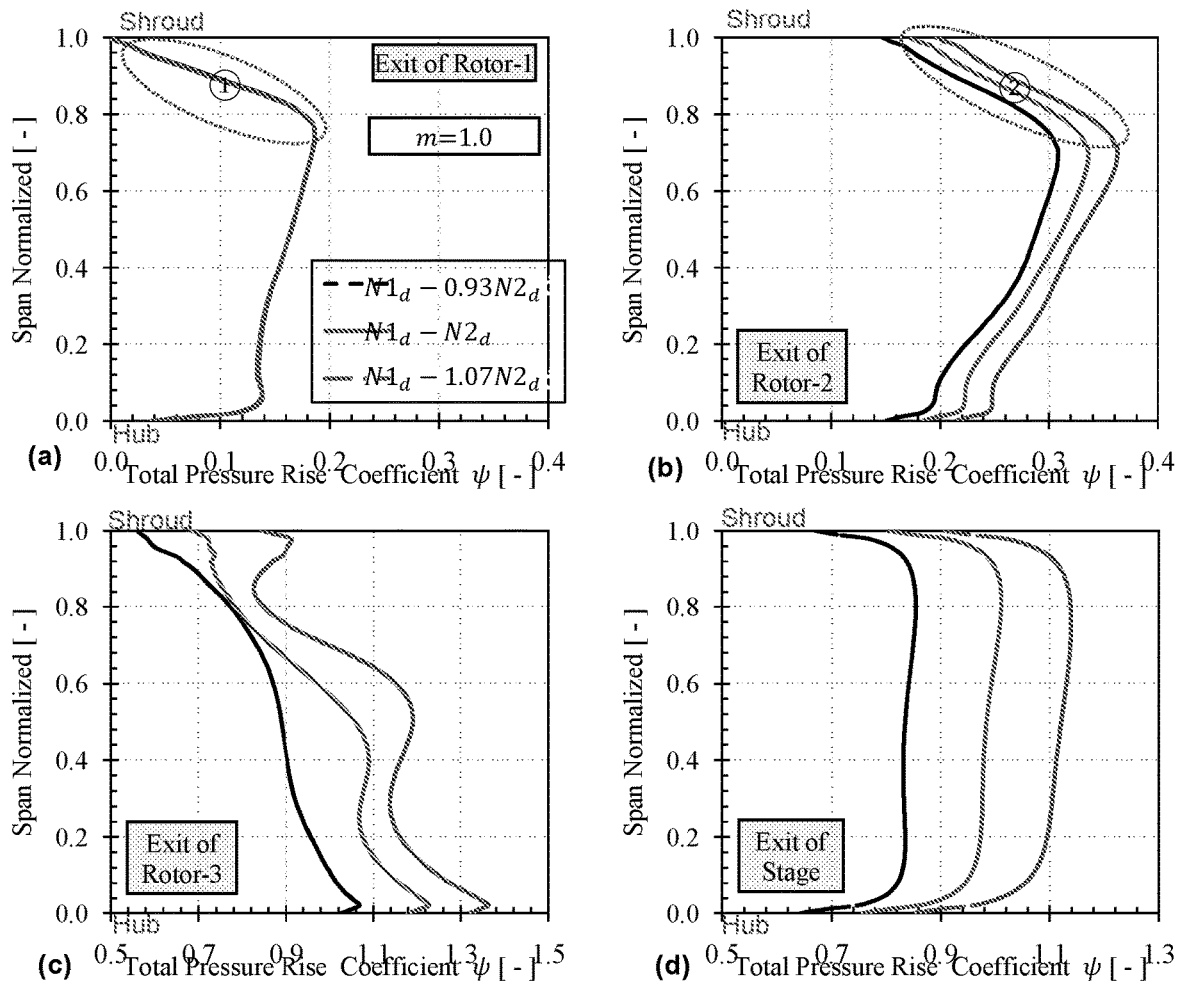
Figure 17. the variation of total pressure rise coefficient $\psi$ along the span for the at the mass flow rate, $m = 1.0$ and speed combinations $N1_d - 0.93N2_d, N1_d - N2_d$ and $N1_d - 1.07N2_d$ at (a) exit of the rotor-1, (b) exit of the rotor-2, (c) exit of the rotor-3, and (d) exit of Exhaust

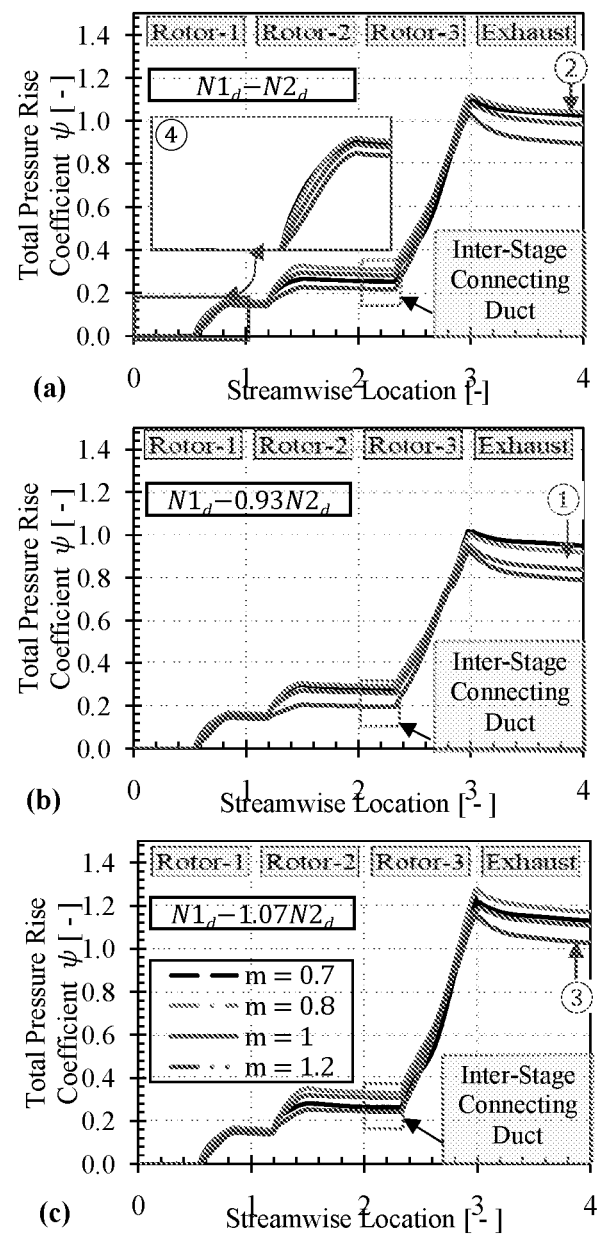
Figure 18. Variation of Total Pressure Rise Coefficient $\psi$ along the streamwise locations for mass flow rates, $m = 0.7, 0.8, 1.0$ and $1.2$ and speed combinations (a) $N1_d - N2_d$, (b) $N1_d - 0.93N2_d$ and (c) $N1_d - 1.07N2_d$

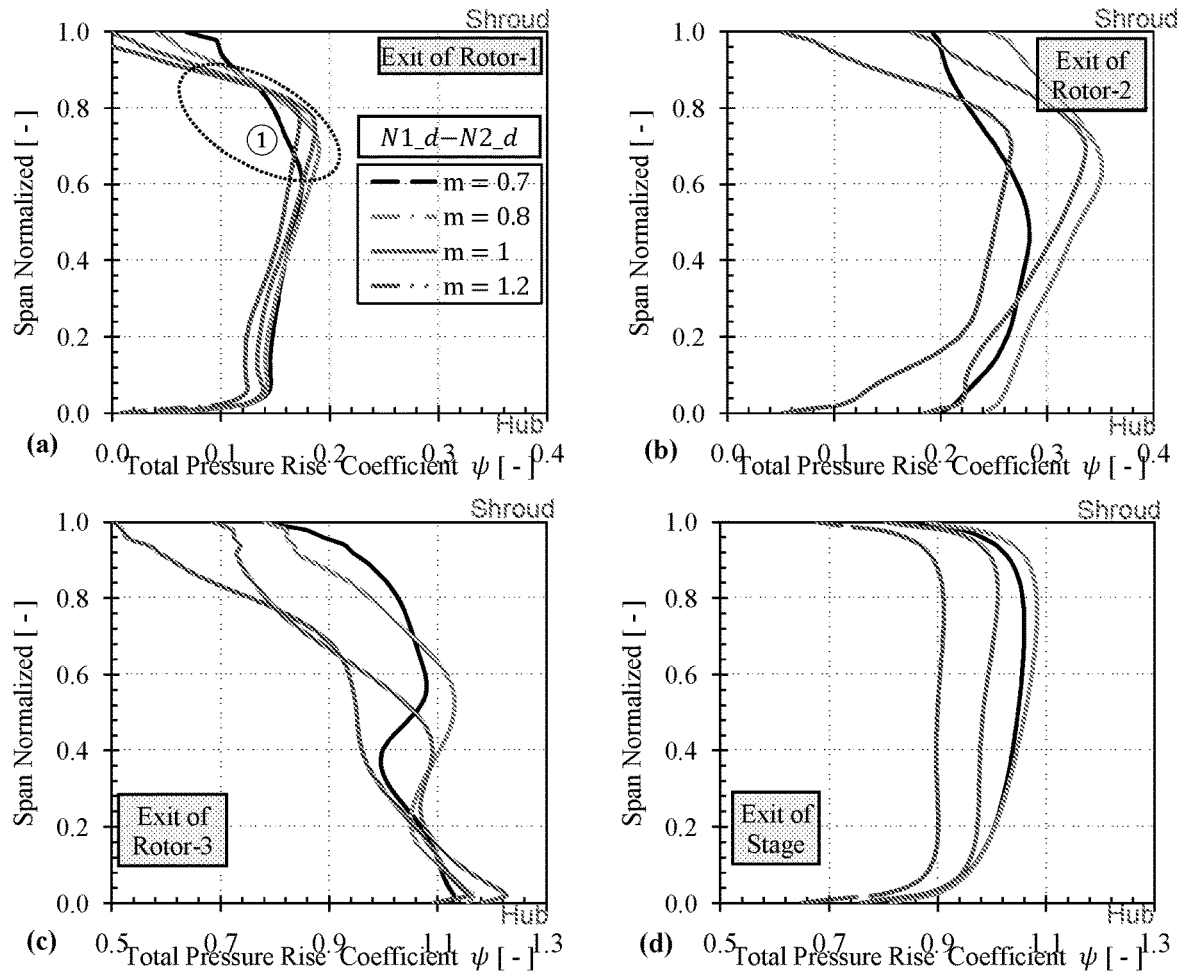
Figure 19. the variation of Total Pressure Rise Coefficient $\psi$ along the span for mass flow rates, $m = 0.7, 0.8, 1.0$ and $1.2$ and the design speed combinations $N1_d - N2_d$ at (a) exit of the rotor-1, (b) exit of the rotor-2, (c) exit of the rotor-3, and (d) exit of Exhaust

AXIAL-CENTRIFUGAL CONTRA-ROTATING LIGHT WEIGHT, COMPACT COMPRESSION SYSTEM

FIELD OF THE INVENTION

The present invention relates to compressor with axial-centrifugal contra-rotating stage for gas turbine engine. More particularly, the present invention is directed to a multi-stage, gas turbine-driven or motor-driven contra-rotating compressor or pump unit for compressing a fluid comprising two rotors of contra-rotating axial compressors, a centrifugal impeller, flow passage, which consists of inter-stage connecting duct between axial and centrifugal compressors; and exhaust diffuser passage of centrifugal compressors with axial exit. Contra-rotating Twin spool/shaft configuration with low-aspect ratio axial compressor stage achieves higher-pressure rise and reduces the requirement of more number of conventional stages. The combination of contra-rotating configuration for the axial compressor with a back end centrifugal compressor leads to a reduction in engine size, weight, number of parts, axial length due to stator-less operation. This configuration produces a higher-pressure rise and swirl-free discharge as per the requirement downstream towards the combustion chamber, suitable for application in small size gas turbine engines, or small aero engines, most significantly for helicopters, propeller-driven business aircraft and APUs for all types of aircrafts. Application to UAVs, MAVs. Various industrial applications such as industrial gas turbine engines, industrial fans, turbochargers, refrigeration compressors, gas processing, and pumping compressors and centrifugal liquid pumps.

BACKGROUND OF THE INVENTION

The aero-engine industry is continuously working towards the improved efficiency and decreased environmental impacts of gas turbine power plants in order to meet the need for reduced operating costs without violating legislation on emitted pollutants and noise. In this view, new engine designs are considered and evaluated by various research programs about propulsive and thermal efficiency, engine weight and size, noise, pollutant emissions, reliability, and safety. The recent trends to improve the propulsive and thermal efficiency are the use of higher inlet temperature and high bypass ratio engine, which leads to a reduction in specific fuel consumption and noise emissions. However, this approach may lead to an increase in engine weight and size consequently increase in nacelle and installation drags. Hence, there is a need to develop new designs and concepts to improve various performance parameters. This can be accomplished by an innovative and unconventional approach to new concepts for the gas turbine or its various components such as fans, compressors, combustors, turbines, exhaust nozzles, etc.

Adopting axial-centrifugal compressor configuration where advantages of both axial and centrifugal can be exploited. In this approach, several axial-flow stages can be replaced by a single back end centrifugal stage giving several advantages such as compact design, fewer parts, improved performance, etc. Contra-rotating turbomachinery component is one such approach, where high-pressure ratio, improved efficiency, and thrust to weight ratio may be achieved by eliminating stator with a rotor rotating in the opposite direction relative to others.

Axial-Centrifugal Compressor Configuration with Low-Aspect Ratio Blading Axial-centrifugal compressor configuration is the forefront of the current compressor technology. It has many applications for small and medium-size turbojet, turboshaft or turboprop engines. However, it should be noted that axial stages followed by a centrifugal stage included in Sir Frank Whittle's original aircraft gas turbine patent enclosed in 1930. It combines the merits and characteristics of the both axial and centrifugal compressors. A higher stage pressure ratio offered by the centrifugal stage may permit replacement of several axial-flow stages to reduce cost. If the axial length available is limited, in this case as well a final centrifugal stage may be selected.

A highly loaded low-aspect-ratio axial can be combined with a centrifugal back end-stage to achieve a high-pressure ratio as well as increased efficiency and stability[1]. The combination of low-aspect-ratio and high loading will result in fewer required stages and fewer airfoil per stage. The larger geometry of low-aspect-ratio blades can also provide improved durability and increased performance retention in extended operation. Whereas a centrifugal compressor as back end-stage can replace a number of small axial stages; while the performance approaching that of axial compressors can be obtained especially in low-flow, low-pressure-ratio applications.

Contra-Rotating Turbomachinery Components

The contra-rotating turbomachinery components i.e. fans, propellers, compressors, and turbines are great potentials for future aero-engine configurations. The typical configuration of a stage for these components is two adjacent rotors one rotating in the opposite direction relative to the other, thus eliminating the need for stators.

There contra-rotating rotors enclosing duct arrangement maybe of ducted or unducted modes. These configurations can decrease the size and weight of an engine by eliminating stators leading to an increase in efficiency, operating range and thrust to weight ratio. Hence, these components can operate on a high-pressure ratio with decreased rotational speeds leading to a significant reduction of engine noise. Another advantage of this concept is by utilizing contra-rotating shafts the gyroscopic moment of aero-engine is reduced.

In the aviation, contra-rotating lift fan and compressor, for a high-performance engine for high thrust to weight ratio will be an important choice. In other applications, such as mine ventilation, tunnels, vessels, etc. this concept is being widely used. In the category of small-sized axial fans, for example, air coolers for electric equipment i.e. laptop, desktop computers, and servers this concept is being widely adopted.

Schweitzer and Fairbanks [1], Duc Vo and Trépanier[2] and Michaud et al. [3] have discussed some aspects of design and experimental studies on axial-centrifugal compressor configurations. The low-aspect-ratio axial (varied from 1.35 for the first rotor to 0.8 for the sixth-stage stator) combined with a centrifugal back end-stage is justified for the consideration for high axial compressor loading levels (15% increase over their current production engine compressors) in terms of increased efficiency and stability [1]. Owen et al. [4], [5], [6] investigated both the axial-centrifugal compressor rig and the engine data, and analyzed stall/surge behavior. Mansour et al. [7] presented results of evaluating and validating three 3D viscous RANS codes, namely, the NASA Glenn Research Center's average-passage program APNASA, the Numeca's Fine Turbo program and the ANSYS/CFX, for an axial-centrifugal compressor test case. They achieved better predictions for the centrifugal impeller with the K-ω/SST turbulence model and for the axial stage with the K-ω/BSL turbulence model using the CFX program.

Researchers have examined the contra-rotating axial compressor extensively on various aspects such as design, parametric studies using numerical and experimental analysis ([8]-[17]). Experimental and numerical investigation shows that varying axial spacing between the rotors does not significantly affect the performance. However, optimum axial spacing for improved performance pointed out by one study of 0.9 chords for a design speed of the rotor-1 in combination with higher off design speed of the rotor-2 [11] and by another study of 0.5 chords . Various studies concluded that increasing the speed combinations (in the range of about 0.8-1.2) resulted in improved performance of the system in terms of efficiency and pressure ratio[8], [10], [11]. They credited this result to the stronger suction effect imposed by the higher rotational speed of the second rotor on the first one.[17].

REFERENCES

[1] J. K. Schweitzer and J. W. FAIRBANKS, "18:1 pressure ratio axial/centrifugal compressor demonstration program," *J Aircr.*, vol. 20, no. 5, pp. 404-410, May 1983.
[2] H. Duc Vo and J.-Y. Trépanier, "Undergraduate Project in Compressor Rig Design, Fabrication, and Testing for Complete Engineering Training," *J. Eng. Gas Turbines Power*, vol. 138, no. 5, pp. 052604-1, 2015.
[3] M. Michaud, P. Milan, and H. D. Vo, "Low-Cost Rotating Experimentation in Compressor Aerodynamics Using Rapid Prototyping," *Int. J. Rotating Mach.*, p. 10, 2016.
[4] A. Owen and J. Davis Milt, "Modeling the dynamic behavior of an axial-centrifugal compression system," in *30th Joint Propulsion Conference and Exhibit*, American Institute of Aeronautics and Astronautics, 1994.
[5] A. K. Owen, D. L. Mattern, and D. K. Le, "Comparisons of Rig and Engine Dynamic Events in the Compressor of an Axi-Centrifugal Turboshaft Engine," *NASA Tech. Memo.* 107339, 1996.
[6] A. K. Owen, D. L. Mattem, D. K. Le, and D. C. Braun, "Forced response testing of an axi-centrifugal turboshaft engine," 1996.
[7] M. L. Mansour, G. Holbrook, J. Gunaraj, M. Qizar, and V. Mangat, "Validation and Calibration of Modem CFD RANS Codes for the Prediction of Transonic Axial-Centrifugal Compressors," *ASME Conf Proc.*, vol. 2008, no. 43161, pp. 385-392, 2008.
[8] H. Nouri, F. Ravelet, F. Bakir, and C. Sarraf, "Experimental Investigation on Ducted Counter-Rotating Axial Flow Fans," in *ASME-JSME-KSME 2011 Joint Fluids Engineering Conference AJK-Fluids 2011*, 2011, p. 9.
[9] H. Nouri, F. Ravelet, F. Bakir, and C. Sarraf, "Experimental Investigations on the Design of A Ducted Counter-Rotating Axial Flow Fans System," in *46th Symposium of Applied Aerodynamics—Aerodynamics of Rotating Bodies*, 2011, p. 10.
[10] A. Mohammadi and M. Boroomand, "Design and internal flow analysis of a ducted contra-rotating axial flow fan," in *ASME International Mechanical Engineering Congress and Exposition, Proceedings (IMECE)*, 2014, vol. 1, p. 11.
[11] C. Mistry and A. M. Pradeep, "Effect of variation in axial spacing and rotor speed combinations on the performance of a high aspect ratio contra-rotating axial fan stage," *Proc. Inst. Mech. Eng. Part A J Power Energy*, vol. 227, no. 2, pp. 138-146, 2013.
[12] C. S. Mistry and A. M. Pradeep, "Design and Performance Analysis of a Low-speed, High Aspect Ratio Contra-rotating Fan Stage," in *Asian International Conference on Fluid Machinery and Fluid Power Technology Exhibition*, 2011, no. 156, p. 10.
[13] H. Nouri, A. Danlos, F. Ravelet, F. Bakir, and C. Sarraf, "Experimental Study of the Instationary Flow Between Two Ducted Counter-Rotating Rotors," *J Eng. Gas Turbines Power*, vol. 135, no. 2, pp. 022601-10, 2013.
[14] N. Nayak and C. Mistry, "Criteria for Selection of Solidity in Design of Contra Rotating Fan Stage," in *National Aerospace Propulsion Conference*, 2017, p. 10.
[15] K. Vijayraj and M. Govardhan, "Aerodynamics of Contra-Rotating Fans With Swept Blades," in *ASME 2015 Gas Turbine India Conference*, 2018, p. 11.
[16] S. Kumar and B. Roy, "Endwall Flow Development Across a Contra-Rotating Fan Unit," in *ASME TURBO-EXPO*, 2000, p. 8.
[17] J. L. Kerrebrock et al., "Design and Test of an Aspirated Counter-Rotating Fan," *J. Turbomach.*, vol. 130, no. 2, p. 021004, 2008.

After reviewing various works available in the open literature, any study relevant directly to the axial-centrifugal contra-rotating compressor configuration could not be located. Hence, there is a need to carry out studies for this configuration. In the present study, studies on axial-centrifugal compressor for contra-rotating configuration is to be carried out. The complexity of this problem is manifold which has components axial compressor, centrifugal compressor and connecting annular duct with the concept of contra-rotation.

U.S. Ser. No. 10/502,143 B2[S. Hiernaux, "U.S. Ser. No. 10/502,143B2 Compressor of axial turbine engine with contra-rotating rotor," BE1024024B1; CA2904069A1; CN105508050A; CN105508050B; EP3006713A1; EP3006713B1; RU2015140939A; RU2015140939A3; RU2703888C2; US2016102607A1; U.S. Ser. No. 10/502,143B2, 2019] titled "Compressor of axial turbine engine with contra-rotating rotor" relates to an axial turbine engine with a turbine, a low-pressure compressor, and a fan. The turbine drives the compressor and the fan via a plurality of epicyclic reducing gears. The rotor of the compressor includes upstream a disc with a row of vanes and downstream a drum with a plurality of rows of vanes. The disc and the drum are connected to different parts of the epicyclic reducing gears, so as to be counter-rotating. The turbine engine includes a row of stator vanes arranged between two rows of rotor blades of the drum of the compressor, so as to straighten the flow and improve the efficiency. The turbine engine includes at least two epicyclic reducing gears, so that the vane rows of the drum turn faster than that downstream, which itself turns faster than the fan.

U.S. Ser. No. 10/378,551 B2[H. D. Vo, "U.S. Ser. No. 10/378,551B2 Counter-rotating compressor," CA2938121A1; US2017074280A1; U.S. Ser. No. 10/378,551B2, 2015] titled "Counter-rotating compressor" relates to a compressor which includes a non-axial first rotor, and a second rotor disposed immediately downstream from the first rotor and being co-axial therewith about a longitudinal axis of rotation. The second rotor rotates in a direction opposite the non-axial first rotor to discharge fluid flow into an uninterrupted passage between an outlet of the second rotor and one of a downstream combustor or a further compression stage. The uninterrupted passage is free of a diffusing passage. A gas turbine engine including such a compressor and a method of compressing fluid flow is also described.

U.S. Pat. No. 6,488,469 B1 [N. YOUSSEF and G. WEIR, "U.S. Pat. No. 6,488,469B1 Mixed flow and centrifugal compressor for gas turbine engine," WO0229252A1; CA2420709A1; CA2420709C; DE60124572T2; EP1322865A1; EP1322865B1; JP2004516401A; U.S. Pat. No. 6,488,469B1, 2002] titled "Mixed flow and centrifugal compressor for gas turbine engine" disclosed a two stage compressor for a gas turbine engine with a mixed flow first stage, a centrifugal second stage, and an intermediate duct. The mixed flow stage has a mixed rotor rotatable about the central compressor axis with a circumferential array of mixed flow blades between the mixed flow hub and an associated mixed flow shroud. The downstream centrifugal stage has a centrifugal rotor rotatable about the same compressor axis. The centrifugal rotor has a circumferential array of radially extending centrifugal flow blades between the centrifugal flow hub and an associated centrifugal flow shroud. An intermediate duct has an inner duct wall defining an axially curvilinear transition surface of revolution between an outlet end of the mixed flow hub and an inlet end of the centrifugal flow hub and an outer duct wall defining an axially curvilinear transition surface of revolution between an outlet end of the mixed flow shroud and an inlet end of the centrifugal flow shroud. Preferably, the intermediate duct has a median inlet radius greater than an intermediate duct median outlet radius whereby air flow from the mixed rotor is directed radially inwardly and axially rearwardly toward the centrifugal rotor.

WO2013141912 A2[J. FENG, G. MEDIC, J. MULUGETA, J. J. SANGIOVANNI, and D. M. VOYTOVYCH, "WO2013141912A2 HYBRID COMPRESSORS AND COMPRESSION SYSTEMS," WO2013141912A2; WO2013141912A3, 2013] titled "Hybrid compressors and compression systems" relates to a compressor (20) has an inlet (24). An outlet (26) is downstream of the inlet along a flowpath when the compressor is in a first operational condition. A centrifugal impeller (28) is mounted for rotation about an impeller axis. A supersonic rotor (30) is mounted for rotation about a rotor axis and configured to rotate opposite the impeller and tangentially compress in the first operational condition.

U.S. Pat. No. 4,428,715 A[J. O. WIGGINS, "U.S. Pat. No. 4,428,715A Multi-stage centrifugal compressor," CA1194461A; EP0080251A1; EP0080251B1; JPS5893986A; U.S. Pat. No. 4,428,715A, 1984] titled "Multi-stage centrifugal compressor" disclosed a centrifugal air compressor (11) has an annular air flow path (14) of progressively increasing diameter and progressively diminishing cross-sectional area in which a plurality of internal compression-diffusion stages (30) are provided. The stages of progressively greater diameter are defined by rows (29) of impeller (12) blades which are alternated with rows (32) of stator blades along the air flow path (14) and each such blade row (29, 32) has a diffusion factor below about 0.55 and a de Haller number above about 0.70. The multi-staged construction combines higher isentropic efficiency with reduced size and may be used as a component of a gas turbine engine (18) or a turbocharger (57) or for other purposes requiring gas compression.

U.S. Pat. No. 8,061,968B2[B. MERRY, C. A. NORDEEN, J. W. NORRIS, and G. L. SUCIU, "U.S. Pat. No. 8,061,968B2 Counter-rotating compressor case and assembly method for tip turbine engine," U.S. Pat. No. 8,061,968B2; US2009162187A1, 2009] titled "Counter-rotating compressor case and assembly method for tip turbine engine" disclosed a tip turbine engine (10) provides an axial compressor (22) having a compressor case (50) from which extend radially inwardly a plurality of outer compressor airfoils (54). The compressor case (50) is directly driven by the rotation of the turbine (32) and fan (28), while at least one gear (77) couples the rotation of the turbine (32) and fan (28) to an axial compressor rotor (46) having a plurality of inner compressor airfoils (52). In this manner, the axial compressor rotor (46) is driven in a direction opposite the direction of the outer compressor airfoils (54), thereby increasing the compression provided by the compressor without increasing the number of airfoils. The outer compressor airfoils (54) are formed on a plurality of outer airfoil assemblies (56) each having an arcuate substrate (58) from which the outer compressor airfoils (54) extend. Each of the outer compressor airfoil assemblies (56) includes more than one axially-spaced stage of outer compressor airfoils (54). For assembly, the outer compressor airfoil assemblies (56) are moved toward the axial compressor rotor (46) and then inserted into the compressor case (50).

U.S. Pat. No. 9,353,754B2[M. S. ATTIA and V. GEHLOT, "US2014286749A1 MULTI-STAGE AXIAL COMPRESSOR WITH COUNTER-ROTATION USING ACCESSORY DRIVE," US2014286749A1; U.S. Pat. No. 9,353,754B2, 2014] titled "Multi-stage axial compressor with counter-rotation using accessory drive" relates to a multi-stage axial compressor for counter rotation. A first series of rotor blade assemblies are mounted on and rotate with the driveshaft, each rotor blade assembly of the first series comprising a rotating stage of the multi-stage axial compressor. A second series of rotor blade assemblies provide a counter-rotating stage of the multi-stage axial compressor. An accessory drive links the second series of rotor blade assemblies to the driveshaft and causes counter-rotation of the second series of rotor blade assemblies.

U.S. Pat. No. 4,502,837A[L. W. BLAIR and A. C. BRYANS, "U.S. Pat. No. 4,502,837A Multi stage centrifugal impeller," CA1233146A; DE3334880A1; FR2533977A1; FR2533977B1; GB2127905A; GB2127905B; IT1168731B; JPS5990797A; U.S. Pat. No. 4,502,837A, 1985] titled "Multi stage centrifugal impeller" relates to a multistage centrifugal impeller in which each blade row is individually matched to optimum efficiency characteristics in a manner which minimizes blade lean. Each blade row is composed of twisted blades which substantially equalize working fluid diffusion from blade root to blade tip while restraining blade lean to less than 15°.

After reviewing various patent and non patent literature works available in the open literature, any study relevant directly to the axial-centrifugal contra-rotating compressor configuration could not be located. Hence, there is a need to carry out studies for this configuration. In the present study, studies on axial-centrifugal compressor for contra-rotating configuration have been carried out. The complexity of this problem is manifold which has components axial compressor, centrifugal compressor and connecting annular duct with the concept of contra-rotation.

In the present invention, an axial-centrifugal compressor of contra-rotating configuration is explored. This invention have prospects of a wide range of applications in various future aero engines, Auxiliary Power Units (APUs), application to Unmanned Aerial Vehicles (UAVs), Micro Aerial Vehicles (MAVs) as well as various industrial applications such as industrial gas turbine engines, industrial fans, turbochargers, refrigeration compressors, gas processing, and pumping compressors and centrifugal liquid pumps. Principally, an aircraft gas turbine engine of turbofan, turbojet, turboprop or turboshaft type having a multistage compressor is the most suitable for the application of this invention.

OBJECTS OF THE INVENTION

The basic object of the present invention is directed to provide an axial-centrifugal compressor of contra-rotating configuration having the potential of a wide range of applications in various future aero engines.

A further object of the present invention is directed to an axial-centrifugal compressor of contra-rotating configuration where stators are eliminated with rotors rotating in opposite direction relative to others, that leads to a reduction in engine size, weight, number of parts, overall engine length and produces a higher-pressure rise and swirl-free discharge as per the requirement downstream towards the combustion chamber.

A still further object of the present invention is directed to an axial-centrifugal compressor of contra-rotating configuration wherein combination of contra-rotating axial compressor stage with a back end centrifugal compressor stage, an inter-stage connecting duct at the entry of the centrifugal compressor and an discharge diffuser at the exit of centrifugal compressor rotor involving radial to axial turning annular passage are selectively provided favouring discharge in substantially axial direction as per the gas turbine engine requirement.

A still further object of the present invention is directed to an axial-centrifugal compressor of contra-rotating configuration that employs twin-spool configuration consisting two rotor blading assemblies, wherein first rotor blading assembly rotates in the direction opposite to the second rotor blading assembly.

A still further object of the present invention is directed to an axial-centrifugal compressor of contra-rotating configuration wherein a first low-pressure rotor blading assembly comprises of at least one axial rotor and a second high-pressure rotor blading assembly comprises of at least two rotors i.e. one axial rotor and one centrifugal rotor.

A still further object of the present invention is directed to an axial-centrifugal compressor of contra-rotating configuration wherein low-aspect ratio configuration are adopted for blades of axial compressor rotor stages whereby low-aspect ratio contra-rotating stage favour achieving higher pressure rise and reduces the requirement of more number of conventional stages, thus, reduction in overall size and weight of the engine.

A still further object of the present invention is directed to an axial-centrifugal compressor of contra-rotating configuration wherein low-aspect ratio configuration of front rotor of the Compressor will be run by LP spool at lower speed and higher aerodynamic loading, favouring Stall free operation of front rotor over wide operating range and wider surge margin.

A still further object of the present invention is directed to an axial-centrifugal compressor of contra-rotating configuration wherein rear rotor run by HP spool, can be rotated at higher speed to improve the performance of contra-rotating stage and provides the operational flexibilities as per the mission requirements of aircraft engines and load requirement of land based gas turbine engines.

Another object of the present invention is directed to an axial-centrifugal compressor of contra-rotating configuration wherein highly loaded low-aspect-ratio blading of the axial compressor result in fewer required stages and fewer blades per stage and the larger geometry of low-aspect-ratio blades also provide improved durability, mechanical suitability and increased performance retention in extended operation.

Yet another object of the present invention is directed to an axial-centrifugal compressor of contra-rotating configuration wherein an inter-stage connecting duct is employed between axial stage and the centrifugal stage, in order to achieve minimized total pressure loss and overall outer diameter of the axial-centrifugal compressor stage by selection of hub diameter of centrifugal rotor.

A further object of the present invention is directed to an axial-centrifugal compressor of contra-rotating configuration wherein a specially designed curved shape discharge diffuser is employed in order to recover higher exit velocity and hence higher kinetic energy of the flow coming out from the centrifugal rotor and meet the requirements of entry velocity to the combustor.

SUMMARY OF THE INVENTION

The basic aspect of the present invention is directed to axial-Centrifugal contra rotating light weight and compact compressor configuration suitable for any working fluid based systems selectively including compressor system with air as working fluid and pumping system with any liquid as working fluid comprising:

axial-centrifugal contra-rotating compressor configuration with at least one back end centrifugal compressor stage;

said axial-centrifugal contra-rotating compressor configuration comprises at least twin-spool configuration comprising of at least two rotor blading assemblies wherein first rotor blading assembly rotates in the direction opposite to the second rotor blading assembly and at least one low-pressure (LP) rotor blading assembly comprising of at least one axial rotor and at least one high-pressure (HP) rotor blading assembly comprising of at least two rotors including one axial rotor and one centrifugal rotor;

flow passage comprising inter-stage connecting duct between axial and centrifugal compressors; and exhaust diffuser passage of centrifugal compressors with axial exit; said compressor system include multistage, gas turbine-driven or motor-driven system.

A further aspect of the present invention is directed to the axial-centrifugal contra rotating light weight and compact compressor configuration suitable for any working fluid based systems comprising said flow passage comprising inter-stage connecting duct between axial and centrifugal compressors and wherein said inter-stage connecting duct comprises an annular shaped duct having mean inlet diameter (exit of contra-rotating stage) greater than mean discharge diameter (entry of centrifugal compressor), said inter-stage connecting duct between axial and centrifugal compressors comprises of an annular duct of S-shaped preferably having Inlet radii, which is the radius of hub and shroud, greater than exit radii.

A still further aspect of the present invention is directed to said axial-centrifugal contra rotating light weight and compact compressor configuration suitable for any working fluid based systems comprising exhaust diffuser passage of centrifugal compressors with axial exit; said exhaust diffuser passage of centrifugal compressors including radial to axial turning annular passage at the exit of the centrifugal impeller rotor-3 to minimize the overall outer dimension where after the passage is directed to either purely axial direction or inclined to axial direction by a small angle in the range of up to 10° to 15° as a curved shape discharge diffuser.

A still further aspect of the present invention is directed to said axial-centrifugal contra rotating light weight and compact compressor configuration suitable for any working fluid based systems
wherein said flow passage comprising inter-stage connecting duct which comprises an annular shaped duct having mean inlet diameter (exit of contra-rotating stage) greater than mean discharge diameter (entry of centrifugal compressor) and wherein said inter-stage connecting duct between axial and centrifugal compressors comprises of an annular duct of S-shaped preferably having Inlet radii, which is the radius of hub and shroud, greater than exit radii;

said exhaust diffuser passage of centrifugal compressors including radial to axial turning annular passage at the exit of the centrifugal impeller is rotor-3 to minimize the overall outer dimension where after the passage is directed to either purely axial direction or inclined to axial direction by a small angle in the range of up to 100 to 150 as a curved shape discharge diffuser.

A still further aspect of the present invention is directed to said axial-centrifugal contra rotating light weight and compact compressor configuration suitable for any working fluid based systems wherein said contra-rotating axial compressor blade comprises low-aspect ratio blades wherein the aspect ratios involving the ratio of the height of the blade to the chord length of the blade, for both blades, are in the range of 0.7 to 1.5 preferably about 0.8 and wherein said axial stages are free of stator blades.

A still further aspect of the present invention is directed to said axial-centrifugal contra rotating light weight and compact compressor configuration suitable for any working fluid based systems wherein said contra-rotating axial compressor blade comprises blade sections being of aerofoil shaped profile.

A still further aspect of the present invention is directed to said axial-centrifugal contra rotating light weight and compact compressor configuration suitable for any working fluid based systems wherein said contra-rotating axial compressor blade comprises
low-aspect ratio blades wherein the aspect ratios involving the ratio of the height of the blade to the chord length of the blade, for both blades, are in the range of 0.7 to 1.5 preferably about 0.8 and said contra-rotating axial compressor blade comprises blade sections being of aerofoil shaped profile.

Another aspect of the present invention is directed to said axial-centrifugal contra rotating light weight and compact compressor configuration suitable for any working fluid based systems comprising selective speed combination of the two spools wherein low-pressure (LP) rotor blading assembly comprising an axial rotor is rotatable at lower speed while the high-pressure (HP) rotor blading assembly comprising of one axial rotor and one centrifugal rotor is rotatable at higher speed.

Yet another aspect of the present invention is directed to said axial-centrifugal contra rotating light weight and compact compressor configuration suitable for any working fluid based systems comprising axial compressor (rotor-1) mounted on front rotor-shaft/LP turbine spool rotating with a rotational speed (N1); and
axial compressor (rotor-2) and centrifugal impeller/compressor (rotor-3) both mounted on rear rotor-shaft/HP turbine spool and hence, rotating at equal speed (N2) and wherein the speed ratios (N2/N1) is of magnitude greater than one preferably in the range of 1.1 to 1.4 and most preferably speed ratio being N2/N1=1.25.

A further aspect of the present invention is directed to said axial-centrifugal contra rotating light weight and compact compressor configuration suitable for any working fluid based systems wherein low-pressure (LP) rotor blading assembly comprising of at least one axial rotor and high-pressure (HP) rotor blading assembly comprising of at least two rotors including one axial rotor and one centrifugal rotor are operable selectively involving (i) co-axial twin spools with the axis of rotation of LP spool being coaxial to the axis of rotation of HP spool and (ii) parallel twin spools wherein the axis of rotation of LP spool is parallel to the axis of rotation of the HP spool.

A still further aspect of the present invention is directed to said axial-centrifugal contra rotating light weight and compact compressor configuration suitable for any working fluid based systems wherein said LP spool and said HP spool include rotor blade assemblies which are housed between spool hub and an outer casing thereof, said rotor blade assemblies including rotor blades being selectively extending outwardly from the said hub and having a tip clearance of gap between the blade tip and said casing and/or mounted on the said casing to extend radially inward from the said casing with a tip clearance or gap between the blade tip of such rotors and the hub of the compressor stage.

A still further aspect of the present invention is directed to said axial-centrifugal contra rotating light weight and compact compressor configuration suitable for any working fluid based systems involving compressor stage adapted for turboprop aero-engine comprising
a. propeller fan with or without cooperating gear box unit connected with the LP turbine spool and is rotatable at lower speed;
b. co-axial twin-spools, the axis of rotation of LP turbine spool being co-axial to the axis of rotation of HP turbine spool;
c. all rotor blades extending radially outward from hub with tip clearance or gap between the blade tip of all rotors and casing of the compressor stage.

A still further aspect of the present invention is directed to said axial-centrifugal contra rotating light weight and compact compressor configuration suitable for any working fluid based systems involving compressor stage adapted for turbofan aero-engine comprising:
a. front fan with or without gear box unit operatively connected with LP turbine spool and is rotatable at lower speed;
b. said compressor stage receiving part of air passing through front fan, the remaining part of the air is passaged through annular space radially outside of the compressor stage, a bypass duct;
c. stator or strut arrangement at forward potion the compressor stage to direct the flow to the bypass duct and the compressor stage;
d. co-axial twin-spools with the axis of rotation of LP turbine spool being co-axial to the axis of rotation of HP turbine spool;
e. all rotor blades extending radially outward from hub with a tip clearance or gap between the blade tip of all rotors and casing of the compressor stage.

A still further aspect of the present invention is directed to said axial-centrifugal contra rotating light weight and compact compressor configuration suitable for any working fluid based systems involving compressor stage adapted for Auxiliary Power Units (APUs) of an aircraft and other compressor and pump applications comprising:

a. volute inlet plenum to deliver fluid to the compressor as intake duct having an opening to annular shaped axial fluid flow passage at discharge;
b. LP turbine spool with or without connected gearbox at forward potions of compressor to transmit power, in particular, to fulfill auxiliary power requirements of the aircrafts;
c. co-axial twin-spools with the axis of rotation of LP turbine spool being co-axial to the axis of rotation of HP turbine spool;
d. all rotor blades extending radially outward from hub with a tip clearance or gap between the blade tip of all rotors and casing of the compressor stage.

A still further aspect of the present invention is directed to said axial-centrifugal contra rotating light weight and compact compressor configuration suitable for any working fluid based systems involving compressor stage configuration comprising:
a. First rotor blade row or LP compressor blade row mounted on the rotating casing whereby power is transmitted to LP compressor blade row from LP turbine spool through the rotating casing;
b. First rotor blade row or LP compressor blade row extending radially inward from casing for this configuration with tip clearance or gap between the blade tip of these rotors and hub of the compressor stage;
c. second rotor blade row or HP compressor blade row extending radially outward from hub with tip clearance or gap between the blade tip of these rotors and casing of the compressor stage;
d. parallel twin-spools with the axis of rotation of LP turbine spool is parallel to the axis of rotation of HP turbine spool.

A still further aspect of the present invention is directed to said axial-centrifugal contra rotating light weight and compact compressor configuration suitable for any working fluid based systems involving compressor stage configuration comprising:
a. volute inlet plenum to deliver fluid to the compressor as intake duct having an opening to annular shaped axial fluid flow passage at discharge;
b. First rotor blade row or LP compressor blade row mounted on the rotating casing whereby power is transmitted to LP compressor blade row from LP turbine spool through the rotating casing;
c. First rotorblade row or LP compressor blade row extending radially inward from casing with tip clearance or gap between the blade tip of these rotors and hub of the compressor stage;
d. Second rotor blade row or HP compressor blade row extending radially outward from hub with tip clearance or gap between the blade tip of these rotors and casing of the compressor stage.
e. parallel twin-spools with the axis of rotation of LP turbine spool being parallel to the axis of rotation of HP turbine spool.

A still further aspect of the present invention is directed to said axial-centrifugal contra rotating light weight and compact compressor configuration suitable for any working fluid based systems involving compressor stage configuration comprising:
a. volute inlet plenum to deliver fluid to the compressor as intake duct having an opening to annular shaped axial fluid flow passage at discharge;
b. First rotor blade row or LP compressor blade row mounted on the rotating casing whereby power is transmitted to LP compressor blade row from LP turbine spool through the rotating casing;
c. one rotor at forward portion of the LP compressor blade row being a power-transmitting member to the whole LP compressor blade row whereby rotor transmits power to other rotors of LP compressor blade row through the rotating casing and wherein the rotor is a shrouded rotor and free of required tip clearance or gap between both either casing or hub;
d. other than one rotor at forward portion, remaining rotors of First rotor blade row or LP compressor blade row extending radially inward from casing with tip clearance or gap between the blade tip of these rotors and hub of the compressor stage;
e. Second rotor blade row or HP compressor blade row extending radially outward from hub with tip clearance or gap between the blade tip of these rotors and casing of the compressor stage;
f LP turbine spool optionally connected to a gearbox at forward potions of compressor to transmit power;
g. co-axial twin-spools with the axis of rotation of LP turbine spool being co-axial to the axis of rotation of HP turbine spool.

Another aspect of the present invention is directed to a method for generating high thrust to weight ratio in compressor or pump systems including compressing of fluid based thrust generation for downstream combustion including aero engines and the like comprising:
involving a combination of contra rotating axial compressor stage with a back end centrifugal compressor stage for generating high pressure rise and swirl free discharge for desired combustion at high thrust to weight ratio enabling selectively anyone or more of:
a. reducing the number of compressor stages required;
b. no need of stator blades for axial stages;
c. reduction of number of stages for HP spool as used single centrifugal compressor to achieve desired pressure rise;
d. Reduction in overall length of the compressor as removal of stator vanes and use of centrifugal compressor;
e. incorporation to reduce no of turbine stages and number of components required even for turbine section.

Yet another aspect of the present invention is directed to said method which is carried out involving twin spool configuration including two rotor assemblies a first rotor assembly which is rotated in a direction opposite to the second rotor assembly and
wherein said first rotor assembly is rotated in a direction opposite to the second rotor assembly and wherein a low pressure [LP] rotor blade assembly used includes at least one axial rotor, which rotates at lower speed and said high pressure [HP] rotor blade assembly used includes at least two rotors i.e. one axial rotor and one centrifugal rotor; which rotate at comparatively higher speed.

and minimizing the total pressure loss by involving an inter stage connecting duct comprising an annular shaped duct having mean inlet diameter, the exit of contra rotating stage greater than mean discharge diameter, the entry of centrifugal compressor and over all outer diameter of the axial-centrifugal compressor stage is adopted by selection of hub diameter of centrifugal rotor;
and wherein for recovery of exit velocity and hence kinetic energy of the flow coming out from the centrifugal rotor and to meet requirements of entry velocity of the combustor is further attained by involving a curved shaped discharge diffuser.

A further aspect of the present invention is directed to said method which is carried out maintaining desired speed combination of the two spools such as to maintain a low-pressure [LP] blading assembly comprising an axial rotor rotating at low speed and a high-pressure [HP] rotor blading assembly comprising one axial rotor and one centrifugal rotor rotating ay higher speed such as to achieve overall pressure rise, wider operating range and higher efficiency.

A still further aspect of the present invention is directed to said method as that is carried out with:
(i) Contra-rotating coaxial Twin spool/shaft configuration:
  a rotor-1 being mounted front rotor-shaft/LP turbine spool rotating with a rotational speed (N1)
  a rotor-2 and a rotor-3, both mounted rear rotor-shaft/HP turbine spool and hence, rotating at equal speed (N2).
  and wherein the speed ratios N2/N1 is having a magnitude greater than one preferably maintaining speed ratio is $N2_d/N1_d = 1.25$ as per required performance from the designed compressor stage.
(ii) contra-rotating axial compressor blade having:
  Low-aspect ratio blades with ratio of the height of the blade to the chord length of the blade, for both blades, maintained in the range of 0.7 to 1.5 preferably about 0.8.
(iii) an aerofoil shaped profile of the blade sections;
(iv) Inter-stage connecting duct between axial and centrifugal compressors comprising
  an annular duct of S-shaped with Inlet radii, the radius of hub and shroud, maintained greater than exit radii.
(v) exhaust diffuser passage of centrifugal compressors involving radial to axial turning annular passage at the exit of the rotor-3 to minimize the overall outer dimension;
  and thereafter directing the passage to either purely axial direction or is inclined to axial direction by a small angle.

A still further aspect of the present invention is directed to said method wherein rotational speed of the rotor 3 was maintained same as that of rotor 2, both being mounted on a common rear rotor shaft and said highly loaded low aspect ratio blading of the axial compressor provided for fewer blades per stage and larger geometry of low aspect ratio blades involved for improved durability, mechanical suitability and increased performance retention in extended operation.

A still further aspect of the present invention is directed to said method wherein the size of the exit duct is selected to manage the small or low Mach number flow at the entry of combustor.

A still further aspect of the present invention is directed to said method wherein said higher stage pressure ratio achieved by the centrifugal stage provides for replacement of several axial-flow stages to reduce over all engine cost and is reduction in over all axial length of the engine.

A still further aspect of the present invention is directed to said method wherein for maximizing pressure ratio and thrust development the following operating parameters were controlled including.
  mass flow range maintained in the range of stall to choke limit;
  the tip clearance range for LP and HP axial rotor blades is in the range of 0.5% to 1.0% of span of the blade &
  Centrifugal rotor the tip clearance in the range of 0.5 to 1% of blade height at inlet and 0.5% to 2.0% of blade width at exit.

The above and other objects and advantages of the present invention are described hereunder in greater details with reference to the following accompanying non limiting illustrative drawings.

BRIEF DESCRIPTION OF THE ACCOMPANYING DRAWINGS

FIG. 1(a): shows the schematic Aerofoil shaped profile of the blade sections. [the aerofoil shape is for illustration, not real used for blades]

Figure 1B:
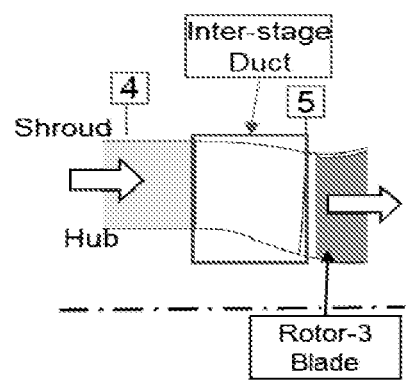

FIG. 1(b): shows schematic representation of Inter-stage connecting annular s-shaped duct between axial and centrifugal compressors.

Figure 1C:
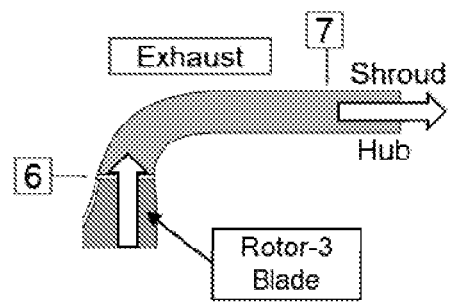

FIG. 1(c): shows schematic representation of exhaust diffuser passage of centrifugal compressors having radial to axial turning annular passage at the exit of rotor 3.

FIG. 1(d): shows the Velocity Triangle representations of rotor-1 and rotor-2 axial flow compressor.

FIG. 2: is an isometric view of configuration of axial-centrifugal contra-rotating compressor showing main components of the present invention.

FIG. 3: is a sectional view of the multi-stage, gas turbine-driven or motor-driven Axial-Centrifugal Contrarotating Compressor or Pump part of the present invention.

FIG. 4: is a sectional view of the multi-stage, gas turbine-driven or motor-driven axial-centrifugal contrarotating compressor with turboprop fan configuration of the present invention.

FIG. 5: is a sectional view of the multi-stage, gas turbine-driven or motor-driven axial-centrifugal contrarotating compressor with turbofan configuration of the present invention.

FIG. 6: is a sectional view of the multi-stage, gas turbine-driven or motor-driven axial-centrifugal contrarotating compressor or pump part with volute Inlet plenum of the present invention.

FIG. 7: is a sectional view of the multi-stage, gas turbine-driven or motor-driven axial-centrifugal contrarotating compressor or pump part having axial inlet with multiple rotors. Here, one rotor blade row mounted on rotating casing.

Figure 8:
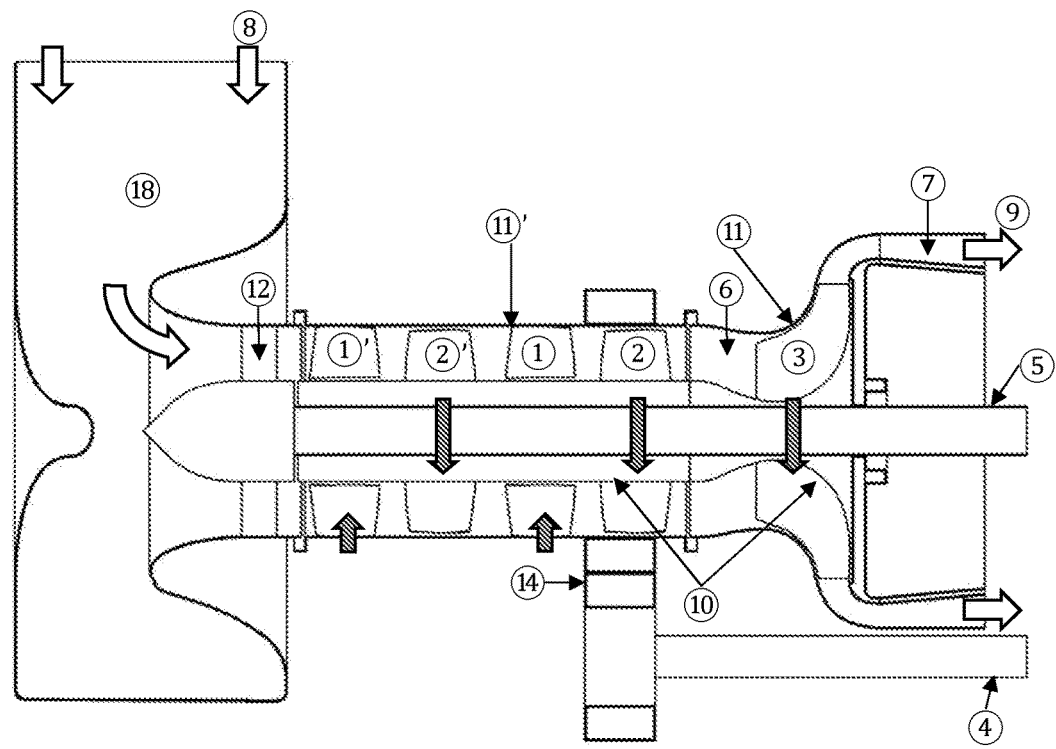

FIG. 8: is a sectional view of the multi-stage, gas turbine-driven or motor-driven axial-centrifugal contrarotating compressor or pump part having volute inlet arrangement with multiple rotors. One rotor blade row mounted on rotating casing.

Figure 9:
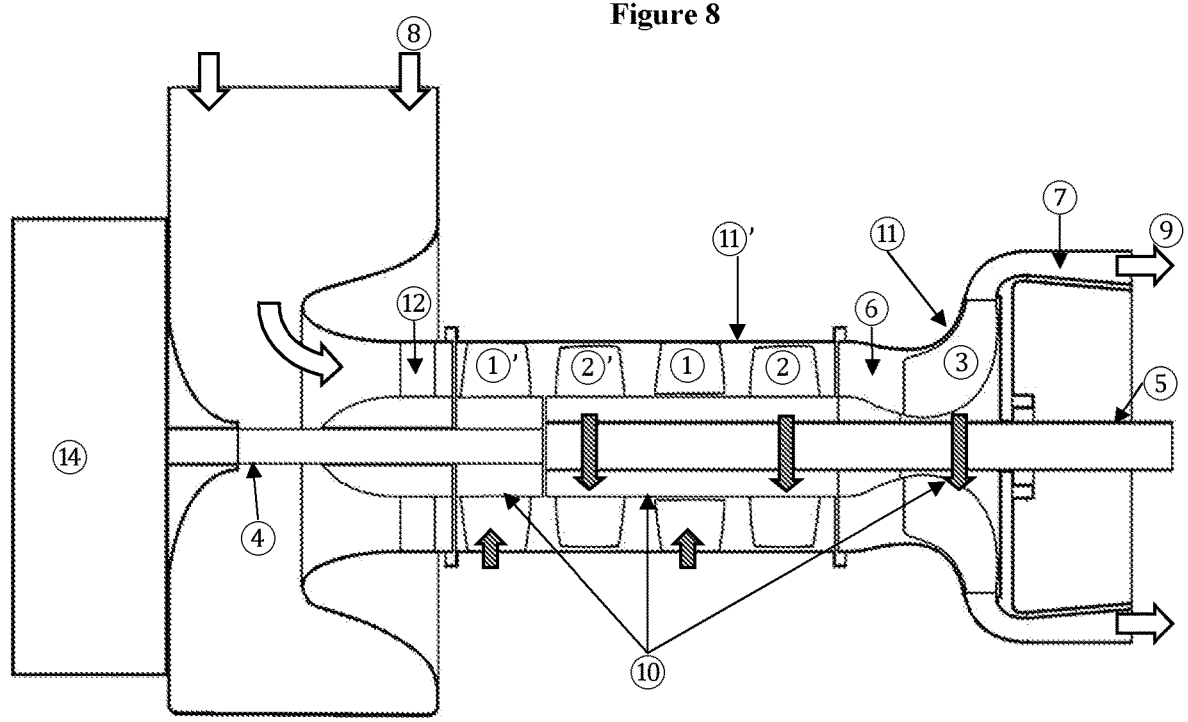

FIG. 9: is a sectional view of the multi-stage, gas turbine-driven or motor-driven axial-centrifugal contrarotating compressor or pump part having volute inlet arrangement with multiple rotors wherein co-axial rotor-shafts are employed.

Figure 10:
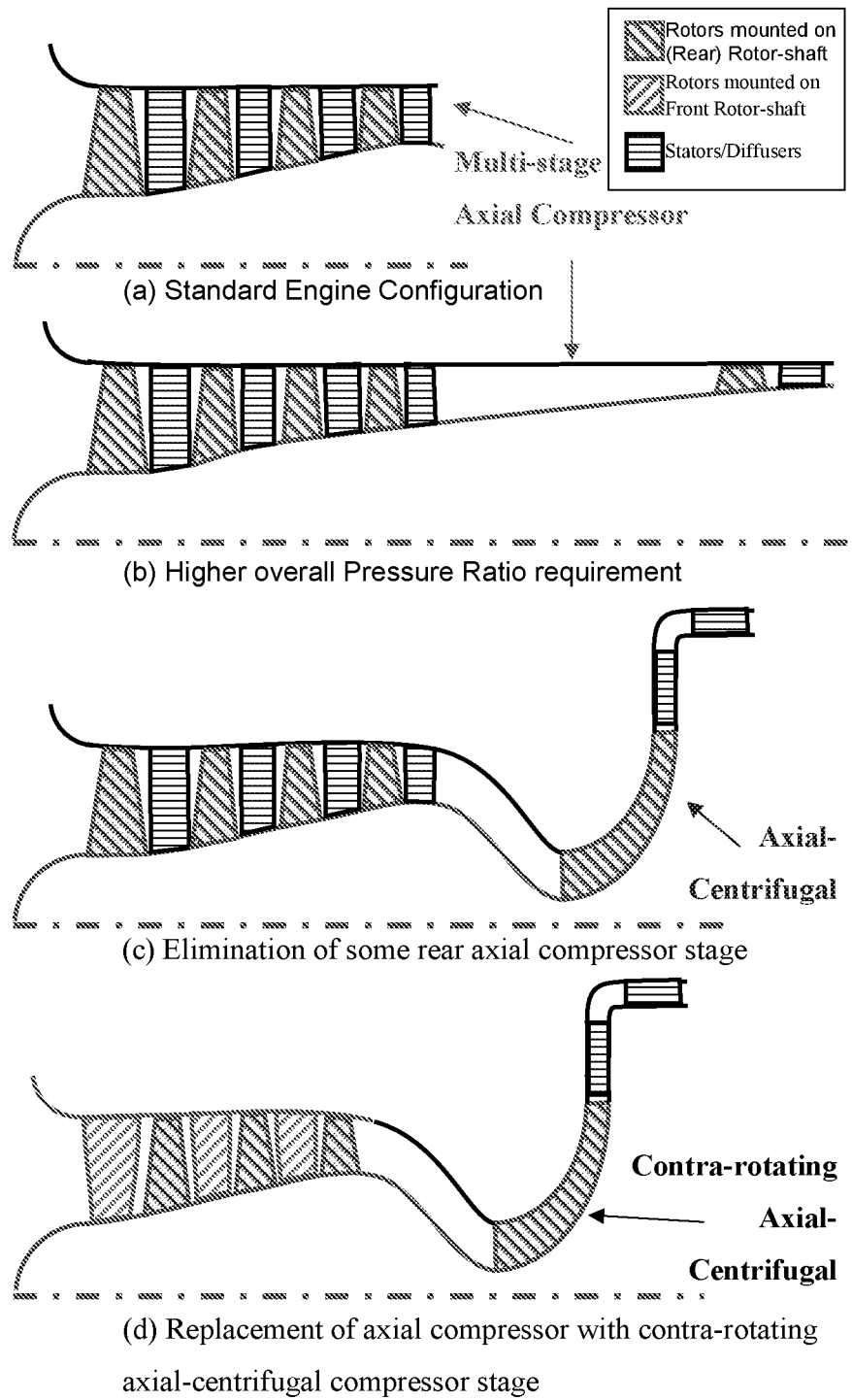

FIG. 10: show the steps of development of Axial-centrifugal compressor with the concept of contra-rotation; (a) Standard Engine Configuration; (b) Higher overall Pressure Ratio requirement; (c) Elimination of some rear axial compressor stage; (d) Replacement of axial compressor with contra-rotating axial-centrifugal compressor stage.

Figure 11:
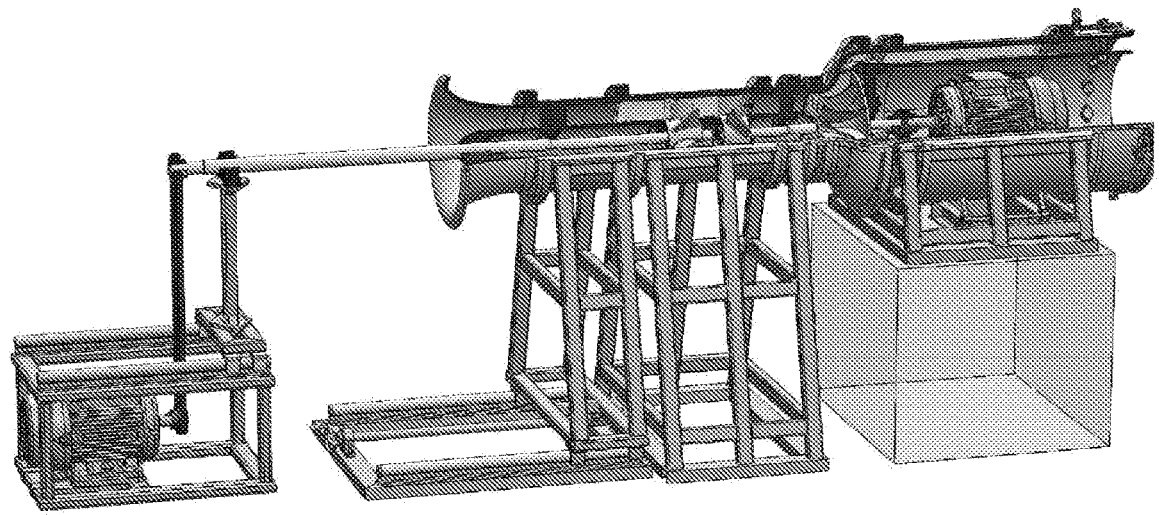

FIG. 11: Proposed Setup for performance testing of Axial-Centrifugal Contrarotating Compressor.

Figure 12:
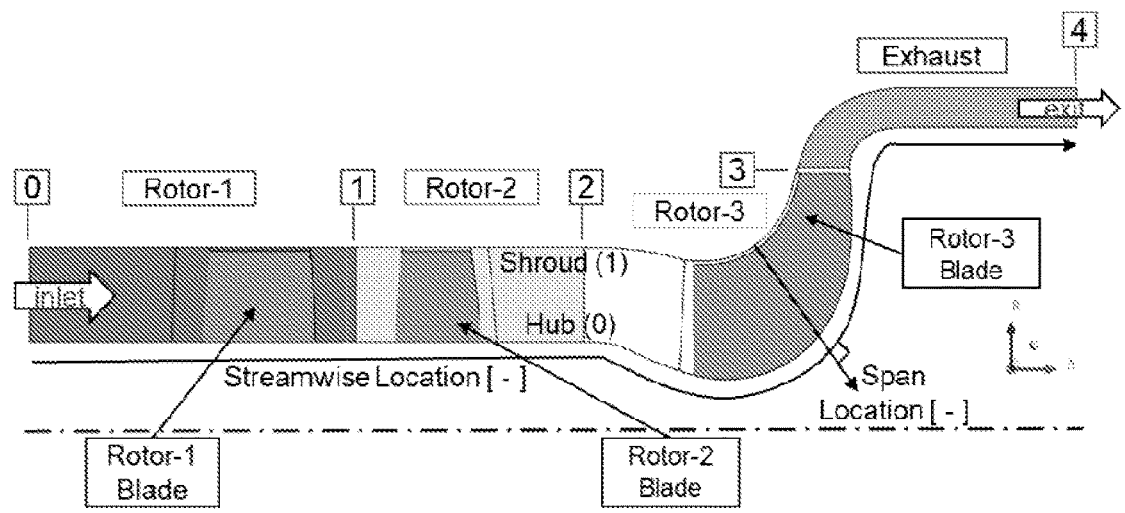

FIG. 12: Flow domain regions and normalized streamwise and span direction.

FIG. 13: shows (a) meshing of domains, and (b) boundary conditions.

FIG. 14: performance characteristics in terms of normalized total pressure rise coefficient ψ and normalized mass flow rate $m\sqrt{T_{0,IN}}/P_{0,IN}$ for the overall stage.

FIG. 15: shows graphically performance characteristics in terms of normalized total pressure rise coefficient ψ' and normalized mass flow rate m$\sqrt{T_{0,IN}}/P_{0,IN}$ (a) for the rotor-1, (b) for the rotor-2, and (c) for the rotor-3.

FIG. 16: shows graphically the variation of Total Pressure Rise Coefficient ψ along the streamwise locations at mass flow rate, m=1.0 and speed combinations $N1_d$–0.93$N2_d$, $N1_d$–$N2_d$ and $N1_d$–1.07$N2_d$.

FIG. 17: shows graphically the variation of total pressure rise coefficient ψ along the span at the mass flow rate, m=1.0 and speed combinations $N1_d$–0.93$N2_d$, $N1_d$–$N2_d$ and $N1_d$–1.07$N2_d$ at (a) exit of the rotor-1, (b) exit of the rotor-2, (c) exit of the rotor-3, and (d) exit of Exhaust.

FIG. 18: shows graphically the variation of Total Pressure Rise Coefficient ψ along the streamwise locations for mass flow rates, m=0.7, 0.8, 1.0 and 1.2 and speed combinations (a) $N1_d$–$N2_d$, (b) $N1_d$–0.93$N2_d$ and (c) $N1_d$–1.07N2d.

FIG. 19: shows graphically the variation of Total Pressure Rise Coefficient ψ along the span for mass flow rates, m=0.7, 0.8, 1.0 and 1.2 and the design speed combinations $N1_d$–$N2_d$ at (a) exit of the rotor-1, (b) exit of the rotor-2, (c) exit of the rotor-3, and (d) exit of Exhaust

LIST OF THE NUMBERED ITEMS IN THE DRAWINGS AS MENTIONED ABOVE

| | |
|---|---|
| 1 | rotor-1 |
| 2 | rotor-2 |
| 3 | rotor-3 |
| 4 | LP Spool/Rotor-shaft-1 |
| 5 | HP Spool/Rotor-shaft-2 |
| 6 | Inter-stage connecting duct |
| 7 | Exhaust |
| 8 | Inlet |
| 9 | Exit |
| 10 | hub |
| 11 | Casing |
| 11' | Casing (Rotating) |
| 12 | Inlet-Strut |
| 13 | Propeller fan |
| 14 | Gearbox |
| 15 | Fan in turbofan configuration |

DETAILED DESCRIPTION OF THE INVENTION WITH REFERENCE TO THE ACCOMPANYING DRAWINGS

In the present invention, an axial-centrifugal compressor of contra-rotating configuration is explored. This invention have a wide range of applications in various future aero engines, APUs, application to UAVs, MAVs as well as various industrial applications such as industrial gas turbine engines, industrial fans, turbochargers, refrigeration compressors, gas processing, and pumping compressors and centrifugal liquid pumps. Principally, an aircraft gas turbine engine of turbofan, turbojet, turboprop or turboshaft type having a multistage compressor is the most suitable for the application of this invention.

The unique design features of this invention are combination of contra-rotating axial compressor stage with a back end centrifugal compressor stage, an inter-stage connecting duct at the entry of the centrifugal compressor and an discharge is diffuser at the exit of centrifugal compressor rotor characterized by radial to axial turning annular passage as per the gas turbine engine requirement. This design configuration leads to a reduction in engine size, weight, number of parts, overall engine length and produces a higher-pressure rise and swirl-free discharge as per the requirement downstream towards the combustion chamber. The contra-rotating configuration employs twin-spool configuration consisting two rotor blading assemblies. First rotor blading assembly rotates in the direction opposite to the second rotor blading assembly. Here, low-pressure rotor blading assembly comprises of at least one axial rotor and high-pressure rotor blading assembly comprises of at least two rotors i.e. one axial rotor and one centrifugal rotor. The parameter aspect ratio for axial rotor blades is defined as ratio of the height of the blade to the chord length of the blade. The blades for axial compressor are adopted of low-aspect ratio configuration. An inter-stage connecting duct is employed in order to achieve minimized total pressure loss and overall outer diameter of the axial-centrifugal compressor stage by selection of hub diameter of centrifugal rotor. This is an annular shaped duct having mean inlet diameter (exit of contra rotating stage) greater than mean discharge diameter (entry of centrifugal compressor). In order to recover higher exit velocity and hence higher kinetic energy of the flow coming out from the centrifugal rotor and meet the requirements of entry velocity to the combustor, a specially designed curved shape discharge diffuser is employed. The speed combination of the two spools is an important design parameter. Low-pressure rotor blading assembly comprising an axial rotor is rotating at lower speed. The high-pressure rotor blading assembly comprising of one axial rotor and one centrifugal rotor is rotating at higher speed. By employing such configuration, one can achieve the benefits of both contra rotating configuration and centrifugal compressor in terms of overall pressure rise, efficiency compared with conventional stage.

The main components of the compressor stages are two rotors of contra-rotating axial compressors (rotor-1 and rotor-2); a centrifugal impeller (rotor-3); flow passage, which consists of inter-stage connecting duct between axial and centrifugal compressors; and exhaust diffuser passage of centrifugal compressors with axial exit (see FIG. 2 and FIG. 3). The configuration proposed in this study has several salient features listed as follows:

(1) Contra-rotating Twin spool/shaft configuration:
   The rotor-1 is mounted front rotor-shaft/LP turbine spool rotating with a rotational speed (N1)
   The rotor-2 and the rotor-3, both are mounted rear rotor-shaft/HP turbine spool and hence, rotating at equal speed (N2).
   The speed ratios N2/N1 is generally having a magnitude greater than one. Design speed ratio is $N2_d/N1_d$=1.25.

(2) Contra-rotating axial compressor blade:
   Low-aspect ratio blades are employed. The aspect ratios i.e. ratio of the height of the blade to the chord length of the blade, for both blades, are about 0.8.
   Aerofoil shaped profile of the blade sections are used as shown in FIG. 1(*a*).

(3) Inter-stage connecting duct between axial and centrifugal compressors:
   The annular duct of S-shaped is employed as shown in FIG. 1(*b*).
   Inlet radii, i.e. the radius of hub and shroud, are greater than exit radii.

(4) Exhaust diffuser passage of centrifugal compressors as shown in FIG. 1(*c*):
   Radial to axial turning annular passage is employed at the exit of the rotor-3 to minimize the overall outer dimension.

Then, the passage is directed to either purely axial direction or is inclined to axial direction by a small angle.

Design Aspects of Contra-Rotating Axial Compressors

For proposed configuration performance assessment, typical meanline aerodynamic design parameters for contra-rotating axial compressor. Some parameters were considered as constraints based on design requirements and some parameters are selected based on design guidelines available for the conventional axial flow compressor stage.

For proposed configuration, the rotor-1 is highly loaded as compare to the rotor-2. It was reported that the selection of higher aerodynamic loading indicates the stall-free operation of the rotor-1 over a wide range of mass flow rates, which makes a broader operating range for the contra-rotating stage. The inlet conditions of the flow were taken as a standard atmospheric condition. The flow to the inlet being assumed purely axial, the inlet absolute flow angle $\alpha_1$ can be assumed axial for contra-rotating axial compressor. Other relative and absolute velocities and angles were calculated based on fundamental velocity triangle of axial turbomachines (FIG. 1($a$):shows the schematic Aerofoil shaped profile of the blade sections. [the aerofoil shape is for illustration, not real used for blades]

FIG. 1($b$): shows schematic representation of Inter-stage connecting annular s-shaped duct between axial and centrifugal compressors.

d). The both axial flow rotors were designed based on variable work loadings along the span with different 11 blade sections from hub to tip.

For the rotor-2, it was assumed that the inlet absolute velocity of the rotor-2 is same as exit absolute velocity of the rotor-1. It is interesting to mention here that the whirl component from the rotor-1 is transferred to the rotor-2, as the rotor-2 is rotating in opposite direction of the rotor-1. Due to this added whirl component, the relative velocity of the flow at the entry of the rotor-2 will be higher, which will be diffused in the rotor-2 passage. For present design, the exit of the rotor-2 is also considered as axial.

The important flow parameters such as velocities, flow angles etc. were calculated based on empirical relations. The geometrical parameters for blades were calculated based geometrical aspect assumed during the initial design stage. The $C_4$ shaped aerofoil profile was selected initially and was modified alter as per the requirement of design.

Design Aspects of Centrifugal Compressor

Assuming minimum total pressure loss from the exit of inter-stage connecting duct, the contra-rotating axial compressor exit condition was taken as inlet condition of the centrifugal compressor i.e. the rotor-3 for initial design condition. The flow to the inlet of centrifugal compressor was assumed to be of purely axial. Hence, inlet absolute flow angle was assumed zero. The design rotational speed of the rotor-3 is same as that of the rotor-2 as both rotors are mounted on the rear rotor shaft. To maintain the conservation of energy and mass principles, total inlet pressure of total inlet and mass flow rate was taken from exit conditions of the flow at contra-rotating compressor exit. Any other relative and absolute velocities and angles were calculated based on fundamentals of turbomachines.

Various Applications of the New (Novel) Products

The axial-centrifugal contra-rotating compressor configuration proposed in this study is a novel concept employing many innovative approaches. This concept produces a compressor configuration with many beneficial and lucrative features such as compact design, fewer parts, improved performance to name a few. This may be achieved by exploiting several advantages of these innovative approaches.

One such approach is axial-centrifugal compressor configuration, which combines the merits and characteristics of both axial and centrifugal compressors. Several axial-flow stages are replaced by a higher stage pressure ratio generating a single back end centrifugal stage. This centrifugal stage may have performance approaching axial stages for a low-flow, low-pressure ratio application.

The contra-rotating axial compressor configuration is another such approach, where stators are eliminated with rotors rotating in opposite direction relative to others. This has several advantages such as a reduction in engine size, weight, number of parts, axial length, etc. due to stator less operation as compared to conventional axial-flow compressor stage. This configuration employed for aero-engines may produce a higher-pressure ratio with decreased rotations speed leading to a significant reduction in engine noise. Moreover, the contra-rotating shafts of this configuration employed in aero-engines reduce the gyroscopic moment.

In another approach, a highly loaded low-aspect-ratio blading of the axial compressor may result in fewer required stages and fewer blades per stage. The larger geometry of low-aspect-ratio blades may also provide improved durability, mechanical suitability and increased performance retention in extended operation. Furthermore, this aspect ratio range is common for rear stages of conventional multi-stage axial flow compressor. In the present study, low-aspect-ratio blades are selected for axial compressor stages, which have applications in small gas turbine engines.

The newly proposed configuration of the axial-centrifugal contra-rotating compressor may have a wide range of applications in various future aero engines, APUs, application to UAVs, MAVs as well as various industrial applications such as industrial gas turbine engines, industrial fans, turbochargers, refrigeration compressors, gas processing, and pumping compressors and centrifugal liquid pumps. Principally, the configuration of the compressor component suggested in this study is focusing on the application to counter-rotating aircraft gas turbine engines. Furthermore, this configuration will be a potential candidate for the small aero engines, most significantly for helicopters, propeller-driven business aircraft and APUs for all types of aircrafts, which typically employs axial-centrifugal compressor configuration.

The main components of the stage are two rotors of contra-rotating axial compressors (the rotor-1 and the rotor-2); a centrifugal impeller (the rotor-3); flow passage, which consists of inter-stage connecting duct between axial and centrifugal compressors; and exhaust diffuser passage of centrifugal compressors.

1. This compressor stage will be employed in turboprop aero-engine as the configuration shown in FIG. 4. In this configuration,
   a. The propeller fan is connected with the LP turbine spool and is rotating at lower speed.
   b. A gearbox may be employed to achieve desired speed of propeller fan.
   c. Co-axial twin-spools are employed. The axis of rotation of LP turbine spool is co-axial to the axis of rotation of HP turbine spool.
   d. All rotor blades are extending radially outward from hub for this configuration. A tip clearance or gap is kept between the blade tip of all rotors and casing of the compressor stage.

2. This compressor stage will also be employed in turbo-fan aero-engine as the configuration shown in FIG. 5. In this configuration,
   a. The front fan is connected with LP turbine spool and is rotating at lower speed.
   b. A gearbox can be employed to achieve desired speed of the front fan.
   c. The compressor stage is receiving part of air passing through front fan. The remaining part of the air is passing through annular space radially outside of the compressor stage also known as bypass duct.
   d. A stator or strut arrangement at forward potion the compressor stage of can be employed to direct the flow to the bypass duct and the compressor stage.
   e. Co-axial twin-spools are employed. The axis of rotation of LP turbine spool is co-axial to the axis of rotation of HP turbine spool.
   f. All rotor blades are extending radially outward from hub for this configuration. A tip clearance or gap is kept between the blade tip of all rotors and casing of the compressor stage.
3. This compressor stage can also be employed in Auxiliary Power Units (APUs) of an aircraft and other compressor and pump applications as the configuration shown in FIG. 6. In this configuration,
   a. A volute inlet plenum is employed which delivers fluid to the compressor characterized as intake duct having an opening to annular shaped axial fluid flow passage at discharge.
   b. The LP turbine spool is connected to a gearbox at forward potions of compressor to transmit power, in particular, to fulfill auxiliary power requirements of the aircrafts.
   c. Co-axial twin-spools are employed. The axis of rotation of LP turbine spool is co-axial to the axis of rotation of HP turbine spool.
   d. All rotor blades are extending radially outward from hub for this configuration. A tip clearance or gap is kept between the blade tip of all rotors and casing of the compressor stage.
4. This compressor stage can also be employed in the configuration as shown in FIG. 7. In this configuration,
   a. First rotor blade row or LP compressor blade row is mounted on the rotating casing. Hence, Power is transmitted to LP compressor blade row from LP turbine spool through the rotating casing.
   b. First rotor blade row or LP compressor blade row extending radially inward from casing for this configuration. A tip clearance or gap is kept between the blade tip of these rotors and hub of the compressor stage.
   c. Second rotor blade row or HP compressor blade row extending radially outward from hub for this configuration. A tip clearance or gap is kept between the blade tip of these rotors and casing of the compressor stage.
   d. Parallel twin-spools are employed. The axis of rotation of LP turbine spool is parallel to the axis of rotation of HP turbine spool.
5. This compressor stage can also be employed in the configuration as shown in FIG. 8. In this configuration,
   a. A volute inlet plenum is employed which delivers fluid to the compressor characterized as intake duct having an opening to annular shaped axial fluid flow passage at discharge.
   b. First rotor blade row or LP compressor blade row is mounted on the rotating casing. Hence, Power is transmitted to LP compressor blade row from LP turbine spool through the rotating casing.
   c. First rotor blade row or LP compressor blade row extending radially inward from casing for this configuration. A tip clearance or gap is kept between the blade tip of these rotors and hub of the compressor stage.
   d. Second rotor blade row or HP compressor blade row extending radially outward from hub for this configuration. A tip clearance or gap is kept between the blade tip of these rotors and casing of the compressor stage.
   e. Parallel twin-spools are employed. The axis of rotation of LP turbine spool is parallel to the axis of rotation of HP turbine spool.
6. This compressor stage can also be employed in the configuration as shown in FIG. 9. In this configuration,
   a. A volute inlet plenum is employed which delivers fluid to the compressor characterized as intake duct having an opening to annular shaped axial fluid flow passage at discharge.
   b. First rotor blade row or LP compressor blade row is mounted on the rotating casing. Hence, Power is transmitted to LP compressor blade row from LP turbine spool through the rotating casing.
   c. One rotor at forward portion of the LP compressor blade row is a power-transmitting member to the whole LP compressor blade row. Hence, this rotor is transmitting power to other rotors of LP compressor blade row through the rotating casing. Thus, this rotor is a shrouded rotor and does not have tip clearance or gap between both either casing or hub.
   d. Other than one rotor at forward portion, remaining rotors of First rotor blade row or LP compressor blade row extending radially inward from casing for this configuration. A tip clearance or gap is kept between the blade tip of these rotors and hub of the compressor stage.
   e. Second rotor blade row or HP compressor blade row extending radially outward from hub for this configuration. A tip clearance or gap is kept between the blade tip of these rotors and casing of the compressor stage.
   f. The LP turbine spool is connected to a gearbox at forward potions of compressor to transmit power.
   g. Co-axial twin-spools are employed. The axis of rotation of LP turbine spool is co-axial to the axis of rotation of HP turbine spool.

The Novelty of the contra-rotating axial-centrifugal compressor according to present invention reside in following features:
   Low-aspect ratio contra-rotating stage to achieve higher pressure rise reduces the requirement of more number of conventional stages. Thus, reduction in overall size and weight of the engine.
   Front rotor of the Compressor will be run by LP spool at lower speed and higher aerodynamic loading.
   Stall free operation of front rotor provides over wide operating range and wider surge margin.
   Rear rotor run by HP spool, which can be rotate at higher speed to improve the performance of contra-rotating stage and provides the operational flexibilities as per the mission requirements of aircraft engines and load requirement of land based gas turbine engines.

Combination of contra-rotating axial compressor stage with a back end centrifugal stage is the unique feature of our claim.

Centrifugal compressor in combination with contra-rotating stage reduces the overall size of the engine for desired pressure rise with minimum stages.

The flow uniformity at the entry of centrifugal compressor can be taken care by incorporating annular connecting duct with comparatively lower diffuser angle and length.

The chances for the flow separation for such diffuser angle is lower and it provides wider operation at mass flow rate for centrifugal compressor. Thus, the overall operating range of the whole axial centrifugal contra-rotating compressor will be higher compared with even conventional axial-centrifugal stage.

Flow coming out from the centrifugal compressor will have higher exit velocity and hence higher kinetic energy, which need to be recovered, else will increase the exit losses.

The shape exit diffuser take care of such acceleration without incorporation of exit vanes. Hence, the size, weight and length requirements will be reduced.

The overall diameter of the engine will be smaller and so can be placed within constrain diameter of engine enclosure.

The salient Inventive features of the present invention include the following:

The configuration proposed in this study has the following salient features:

1. The front rotor-1 is rotating at lower speed and is connected with the LP turbine spool as shown in the FIG. 3.
2. The rear rotor-2 and rotor-3 are placed on the same shaft. These rotors are rotating at higher speed and thus can be placed on HP turbine spool.
3. The concept of two spool turbojet or turboshaft can be easily accommodated without modifications.
4. The blades for contra-rotating compressor are of low-aspect ratio configuration, which gives benefit to avoid the flutter problem found in the high aspect ratio blades.
5. The low-aspect ratio blades can be rotated at comparatively higher speed without much mechanical constraints. So higher per rotor pressure rise can be achieved for both the rotors.
6. Due to higher per rotor pressure rise the number of stages required can be reduced and hence the overall length of the engine.
7. The selection of the centrifugal compressor diameter ratio helps in reducing the diameter of the centrifugal rotor. This will be helpful in accommodating gas turbine engine in small diameter enclosure casing.
8. The higher exit velocity from the rotor can be decelerated using the exit vane arrangements but putting such number of vanes increases the weight and maximum diameter of the engine.
9. The specially designed exit duct with curved shape to manage the flow and later was diffused using the diffuser shaped exit duct
10. The size of exit duct will be helpful in managing the small low Mach number flow at the entry of combustor.
11. All rotor blades are extending radially outward from hub for the configuration shown in the FIG. 3. A tip clearance or gap is kept between the blade tip of all rotors and casing of the compressor stage.

The Distinguishing Advantageous Features of the Present Invention Over the Comparable Prior Inventions:

The evolution of the multi-stage axial compressor component of the aero gas turbine engine is attributed to the requirement of high-pressure ratios. This pressure ratio can be increased by increasing the number of stages with axial flow compressors. This flow path indicating this modification is shown in FIGS. 10(*a*) and (*b*). This may lead to an increase in axial length and hence, may increase in the overall size, weight, and length of the gas turbine compressor stage. This compromise may be acceptable land-based gas turbine power plants, where space, weight, and placement are not major concerns. However, it is highly undesirable for an aero gas turbine engine, where space and weight are major concerns.

It is evident that aspect ratio, i.e. ratio of the height of the blade to the chord length of the blade, of rotor and stator blades decreases with the increase in a number of stages to satisfy the equation of continuity as density increases with increase in pressure. It means the height of the blades later stages become increasingly small. These blades maybe subjected to relatively higher adverse end wall effects and increased boundary layer growth. This may be due to the compounding of the adverse effects of previous stages. Hence, this may reduce the efficiency of later stages considerably and may increase susceptibility to flow instabilities. If one considers the case of small aero engines, a further increase in a number of stages may render later stages ineffective due to this smaller blade height problem.

Axial-centrifugal compressor configuration is the forefront of the current compressor technology. It has many applications for the small and the medium-size turbojet, turboshaft or turboprop engines. It combines the merits and characteristics of both the axial and the centrifugal compressor. The centrifugal compressor can handle easily the flow at the rear stage to achieve a higher-pressure ratio. This higher stage pressure ratio offered by the centrifugal stage may permit the replacement of several axial-flow stages to reduce overall engine cost. It gives added benefit in terms of a reduction in the overall axial length of the engine.

A highly loaded low-aspect-ratio axial can be combined with a centrifugal back end-stage to achieve a high-pressure ratio as well as increased efficiency and stability. The combination of low-aspect-ratio and high loading will result in fewer required stages and fewer airfoil per stage. The larger geometry of low-aspect-ratio blades can also provide improved durability and increased performance retention in extended operation. Whereas a centrifugal compressor as back end-stage can replace a number of small axial stages; while the performance approaching that of axial compressors can be obtained especially in low-flow, low-pressure-ratio applications.

For the small aero engines, the strategy adopted to achieve a high-pressure ratio by combining one or several axial stages with a back end centrifugal compressor (see FIG. 10(*c*)). The several advantages of axial-centrifugal compressor configuration with low-aspect-ratio blading are discussed already in the previous sections. Moreover, combination contra-rotating configuration for the axial compressor with a back end centrifugal compressor (see FIG. 10(*d*)) may lead to a further reduction in engine size, weight, number of parts, axial length due stator-less operation. This configuration may produce a higher-pressure rise and swirl-free discharge as per the requirement downstream towards the combustion chamber.

Proposed Experimental Validation Study

An experimental setup is in designed and development stage to carry out the validation study of this invention as shown in FIG. 11. The experimental study on the performance of the stage will be carried out which include performance of rotor-1, rotor-2 and rotor-3 as individual as well as in stage configuration. Further detailed flow filed study at the entry and the exit of rotors will be carried out to investigate the effects of performance changing flow parameters. This study leads to investigate the optimum axial spacing between rotors and speed ratio, aerodynamic design point and stable operating range of stage. Moreover, unsteady flow field measurements between rotors, at the exit of rotor, interconnecting duct, entry and exit of centrifugal compressor is be carried out. This assessment of unsteady parameters gives a crucial insight into unsteady rotors interaction. To establish the accuracy of results, the uncertainty analysis to estimate the errors associated with measurements is to be carried out.

Numerical Validation and Proof of Concept

Design of Blades

Meanline aerodynamic design calculations correlated with empirical data were performed to determine the dimensions of the axial-centrifugal contra-rotating stage. The rotor-1 and the rotor-2 blade geometry defined by a series of curves are calculated for a standard $C_4$ aerofoil, which is reasonably apt for low-speed application. The rotor-3 physical geometry was generated using known Turbomachinery design software. A conservative clearance of 3 mm between the shroud tip and casing was modeled for all three rotors.

Description of Numerical Methodology

The numerical analysis was carried out for four different flow domains as shown in Figure. The domain-1 is the rotor-1 domain, which consists of inlet passage placed 1.5 chord upstream of the rotor-1 blade. The axial spacing between the rotors of contra-rotating stage was assumed to be 0.7 of chord. Based on the spacing, 0.35 times chord of the rotor-1 was considered to be the exit of the rotor-1 domain near hub. Similarly, for the rotor-2 the inlet passage was considered at 0.35 chord upstream from the rotor-2 at hub and one chord downstream as outlet. The inlet hub diameter of centrifugal compressor was considered to be smaller and hence, s-shaped diffuser duct was placed in between the exit of contra-rotating stage and centrifugal compressor. The axial-centrifugal contra-rotating compressor designed for having axial exit from centrifugal rotor, which is having turning from radial to axial. The exit of centrifugal stage has higher kinetic energy, which accelerate the flow downstream at the exit. In order to decelerate the flow, the domain at the exit was designed with diffuser shape to meet the requirements downstream.

The parameters were evaluated to a transformed normalized coordinate system, typically used in the turbomachinery analysis, as shown in FIG. 12. The coordinates defined as streamwise locations along with the flow passage and span locations perpendicular to streamwise locations. These coordinates are varying as the following.

| Streamwise Locations |
|---|
| 0-1: rotor-1 domain |
| 1-2: rotor-2 domain |
| 2-3 : rotor-3 domain |
| 3-4: exhaust passage domain |

| Span Location |
|---|
| 0: Hub |
| 1: Shroud |

Performance Characteristics and Parametric Studies

The performance characteristics of the overall stage and individual rotors i.e. contra-rotating axial stage consisting of the rotor-1 and the rotor-2, and centrifugal impeller i.e. the rotor-3, are shown in FIG. 13 and FIG. 14. These figures depict the constant speed characteristics curves for speed combinations $N1_d$–$N2_d$, $N1_d$–$0.93N2_d$ and $N1_d$–$1.07N2_d$ in terms of total pressure rise coefficient $\psi$ for normalized mass flow rates, m=0.7, 0.8, 1.0 and 1.2.

In order to predict the performance of the axial-centrifugal contra-rotating compressor, the numerical study was performed through software assisted experimentation. Only one passage of each domain was considered for analysis to reduce the computational power and time requirement. Rotational periodic boundary conditions were applied. Mesh generation of each domain was performed independently through experimental study using hexahedral elements for all domains. The domains between the rotors were connected using Frozen rotor interface as boundary condition. Shear stress transport model was used as a turbulence model.

For mesh generation, The $Y^+$ value was selected as 1 around the blades was to capture detailed the boundary layer effect. Mesh expansion rate was selected to be 1.3. Total pressure inlet and mass flow outlet boundary conditions are used. For analysis, this gives flexibility to carry out the detailed study with the wide range of mass flow rates. Inlet turbulence intensity was taken 5%. The rotor-1, rotor-2 and rotor-3 volumes except shroud and inlet were placed in Rotational frame of reference. Whereas, for exhaust diffuser was considered in Stationary frame of reference. The stationary and moving walls are modeled as smooth non-slip walls. All residuals converged to at least 1.0 e-04 level.

The numerical study has been carried out for four different normalized mass flow rates of $m\sqrt{T_{0,IN}}/P_{0,IN}$=0.7, 0.8, 1.0 and 1.2 normalized by design mass flow rates. For present study, the design speed, $N1_d$ of the rotor-1, mounted on the front rotor-shaft, and design speed, $N2_d$ of the rotor-2 and the rotor-3, mounted on the rear rotor-shaft, are different. These two rotational speeds are represented here as one parameter known as speed combinations. The speed combinations were studied by keeping rotational speed of the front rotor-shaft, N1 constant at design speed and varying the rotational speed of rear the rotor-shaft, N2. Apart from the design speed combination of $N1_d$–$N2_d$, the two other speed combinations studied are $N1_d$–$1.07N2_d$ and $N1_d$–$0.93N2_d$. Hence, the rotation speed of the rotor-2 and the rotor-3, N2 were varied in proportion of about 7% higher and lower to design speed, $N2_d$.

Theory of Proof

For the evaluation of the stage performance of individual rotor and overall stage, the parameters like the total pressure rise coefficient and coefficient of pressure were considered throughout the study. Total pressure rise coefficient, $\psi$ is defined as the ratio of total pressure rise $(P_{0,Rn,OUT}-P_{0,Rn,IN})$ with respect to the design dynamic pressure rise available at the stage inlet.

$$\psi = \frac{P_{0,Rn,OUT} - P_{0,Rn,IN}}{\frac{1}{2}\rho C_{a,d,IN}^2}$$

Here, $P_{0,Rn,OUT}$ is mass averaged total pressure at the exit plane of a rotor flow domain or total stage and $P_{0,Rn,IN}$ is mass averaged total pressure do the inlet plane of a rotor flow domain or total stage, both were considered in the stationary frame of reference. This parameter, total pressure rise coefficient i), was normalized with design total pressure rise of the overall stage. Another parameter, coefficient of pressure, Cp at any given point in a flow domain is defined as the ratio of static pressure rise ($P_x - P_{Rn,IN}$) with respect to mass averaged domain inlet dynamic pressure ($P_{0,Rn,IN} - P_{Rn,IN}$).

$$Cp = \frac{P_x - P_{Rn,IN}}{P_{0,Rn,IN} - P_{Rn,IN}}$$

Here, $P_x$, $P_{0,Rn,IN}$ and $P_{Rn,IN}$ are static pressure at any given point, mass averaged inlet total pressure of the domain and mass averaged inlet static pressure of the domain, respectively. The mass flow rate was calculated using m $\sqrt{T_{0,IN}}/P_{0,IN}$ for stage inlet total temperature $T_{0,IN}$ and stage inlet total pressure $P_{0,IN}$ and was normalized with the design mass flow rate.

Performance Characteristics and Parametric Studies

The performance characteristics of the overall stage and individual rotors i.e. contra-rotating axial stage consisting of the rotor-1 and the rotor-2, and centrifugal impeller i.e. the rotor-3, are shown in FIG. 14 and FIG. 15. These figures depict the constant speed characteristics curves for speed combinations $N1_d$–$N2_d$, $N1_d$–$0.93N2_d$ and $N1_d$–$1.07N2_d$ in terms of total pressure rise coefficient ψ for normalized mass flow rates, m=0.7, 0.8, 1.0 and 1.2.

Performance Characteristics of the Overall Stage

The performance characteristics of the overall stage show uniform and wide characteristics as shown in FIG. 14. The total pressure rise coefficient is forming largely negative slope for a particular speed combination within the prescribed ranges of mass flow rates except for two points at mass flow rate m=0.7 of speed combinations $N1_d$–$N2_d$ and $N1_d$–$1.07N2_d$. This is in line to conventional compressor stages. Thus, these ranges maybe forming the overall stage operating range, where a stable and stall-free operation of the compressor stage maybe obtained. With the reduction in speed of rear the rotor-shaft, the total pressure rise of the compressor is reducing and the stage is showing wider characteristics.

Performance Characteristics of the Rotor-1

The rotor-1, mounted on front the rotor-shaft, of the contra-rotating axial compressor shows flatter performance characteristics with the variation of mass flow rate (FIG. 15 (a)). This is an indication of the stable and largely stall-free operation of the rotor-1. In addition, the plot also shows the rotational speed of the front the rotor-shaft is kept constant and the rotational speed of rear the rotor-shaft is varied to higher and lower values. Hence, it is interesting to observe that the change in speed combinations has a negligible effect on the performance of this rotor-1. Hence, the rotor-1 shows the wider operating characteristics with a change in mass flow rate and nearly stall free operation.

Performance Characteristics of the Rotor-2

The rotor-2, mounted on rear the rotor-shaft of the contra-rotating axial compressor is behaving as conventional axial flow compressor and is showing variations with mass flow rate and speed as shown in (FIG. 15 (b)). The variations in total pressure rise coefficient are forming a positive, peaking to a maximum and then, a negative slope with a change in mass flow rate for a particular speed combination. The maximum total pressure rise coefficient is occurring about mass flow rate m=0.8 for the all speed combinations. This rotor shows a reduction of the total pressure rise coefficient for the mass flow rates of less than m=0.8 for these speed combinations. This maybe indicating the occurrence of the stall and unstable operation for these ranges of mass flow rates. This rotor exhibits consistent performance for mass flow rates greater than m=0.8 for all speed combinations. For this particular range, the total pressure rise coefficient is increasing with the increase in speed for the same mass flow rate. This is evident from the figure that, for $N1_d$–$0.93N2_d$, largely negative slop is occurring with a change in mass flow rate.

Performance Characteristics of the Rotor-3

Conventional centrifugal compressors have wide and stable operating characteristics. The rotor-3 of the stage, which is a typical centrifugal compressor, exhibits similar behavior, as anticipated, with a change in mass flow rate and speed as shown in FIG. 16(c). For this rotor, the total pressure rise coefficient is decreasing with a decrease in speed for a particular mass flow rate. Overall, this rotor showing wider operating characteristics with a reduction in speed. Whereas, this rotor exhibits simply negative slope within the prescribed ranges of mass flow rates for a particular speed combination. This is an indication of a stall-free and stable operation of the rotor-3. It is evident that the rotor-3 is influencing predominately the performance of the overall stage, which has stable and stall-free operation. Moreover, the total pressure rise developed by the rotor-3 is larger relatively than the other two rotors as per design.

Effects of Variation of the Speed Combinations

The effects of variation of speed combinations were studied using the total pressure rise coefficient along the streamwise locations as shown in FIG. 16. The pressure rise coefficient was evaluated for three speed combinations $N1_d$–$0.93N2_d$, $N1_d$–$N2_d$ and $N1_d$–$1.07N2_d$ at the design mass flow rate. It is interesting to the observer that for these speed combinations, total pressure developed by each rotors shows uniform rise along the rotor passage in the streamwise direction. The characteristics plots show all rotors are connected in series. The change in speed combinations within the aforementioned described range has a significant effect on the performance of the overall stage as shown in FIG. 16④. With an increase of speed, $0.93N2_d$ to $1.07N2_d$ resulted in an increase of the total pressure rise coefficient.

It is interesting to observe that the performance of the rotor-1 remains constant in terms of pressure rise along the streamwise direction for all speed combinations. With increasing the speed of the rotor-2, the pressure rise obtained by the rotor-2 is higher compared to the design condition. Similar increasing pressure trends were observed for the rotor-3, i.e. centrifugal rotor. For the lower rotational speed of the rotor-2 and the rotor-3, the performance of the rotor-1 is not changing. However, for the rotor-2 and the rotor-3, it has a significant effect on pressure rising capacity along the streamwise direction.

The speed combinations were varied by keeping the rotational speed of the is front rotor of the contra-rotating axial compressor i.e. the rotor-1 constant. This is particularly beneficial to the overall operation of the stage given the higher loading of the rotor-1. The performance of this rotor remains unhindered by the variation of the rotational speed of other rotors for these speed combinations as shown in FIG. 16Q. However, in open literature, it has been reported that although front has stable operating range due to change in speed combinations by keeping the rotational speed of the rotor-1 constant, its performance gets affected slightly due to the upstream effect of back rotor/rotors.([8], [10], [11]). The stable operating characteristics of the front rotor without any significant change in performance with the change in speed combinations are the significant achievement towards the improved performance and overall wider operating range for the proposed design of contra-rotating axial compressors.

In contrast to the rotor-1, the rotor-2 and the rotor-3 are showing a significant change in total pressure rise coefficient with a change in speed combinations of front and rear the rotor-shafts. These two rotors were mounted on the rear the rotor-shaft which rotational speed is varying with the change in speed combinations. Hence, with an increase in speed combination, the total pressure rise coefficient for the rotor-2 and the rotor-3 increasing noticeably throughout the streamwise direction as shown in FIG. 16④ and ③. This is an indication of improvement in the performance of both the rotor-2 and the rotor-3 in terms of total pressure rise.

The observations of the streamwise plot of the total pressure rise coefficient, as shown in FIG. 17, can be studied in more detail with the plots of total pressure rise coefficient along the normalized span as shown in Figure. The total pressure rise along the span for the rotor-1 remains unchanged with the change in speed combinations as shown in FIG. 17(a). This is in line with the discussion of the variation of total pressure rise coefficient along the streamwise. Whereas for the rotor-2, the total pressure rise coefficient varies throughout the span with the change in speed combinations as shown in FIG. 17(b).

The tip clearance gap between the shroud surface and the blade tip of the rotor-1 and the rotor-2 was kept about 4% of the span. The combined effect of boundary layer growth along the flow direction and tip leakage flow can be observed clearly near the shroud region. The loss because of tip leakage has an effect up to around 75% span for the rotor-1. However, for the rotor-2, the flow behavior in the tip region is different from that of the rotor-1. This rotor has a combined effect of already leaked tip flow coming out from the rotor-1 along with boundary layer growth and tip leakage flow from the rotor-2 itself. Overall, it shows the tip leakage flow at the exit of the rotor-2 extended up to around 65% span.

The tip leakage losses are more prominent for lower rotational speed and hence the pressure rising capacity of the rotor-2 seems to be lower for the lower rotational speed of the rear the rotor-shaft. Whereas for the higher rotational speed of the rear the rotor-shaft, the leakage losses contribute equally along the span. Thus, overall the total pressure rise is higher for the higher rotational speed of the rear rotor-shaft.

For the centrifugal rotor, the performance is influenced considerably due to complex and three-dimensional flow development within the flow passage. FIG. 17(c) shows the spanwise total pressure rise of the centrifugal rotor. For backward curved centrifugal rotor (20 deg angle), the higher loading was observed near the hub region and lower loading towards the shroud region. The endwall effects along the shroud region is the major contributor to these effects due to tip clearance. The tip leakage flow from the centrifugal compressor leads to reduce the total pressure rising capacity near the shroud region. It is interesting to observe that with an increase in rotational speed of rear shaft the performance along the span improves compared to design speed combination. While for lower rotational speed, the pressure rising capacity seems to be reduced along the span. More reduction in total pressure can be found near the shroud region. The exit is span width of the centrifugal compressor is relatively smaller than the inlet span width due to the peculiar shape of these compressors. Hence, the relative tip clearance with respect to the span is on the relatively higher side at the exit of centrifugal compressor than the inlet of centrifugal compressor, as the constant tip clearance gap was maintained throughout the passage. It shows the benefit of providing variable tip clearance at the design stage of centrifugal compressor.

The proposed stage design is with consideration to apply the compressor stage for aero-engine. For aero-engines, the exhaust from the centrifugal compressor needs to be changed in the direction from radial to axial direction with minimum entry Mach number. It is evident from FIG. 17(c) that the flow coming out from the axial-centrifugal contra-rotating stage is three-dimensional in nature with very high kinetic energy. This kinetic energy needs to be converted to pressure energy using special flow passage at the exit and the flow can be directed to the combustion chamber downstream in the axial direction. The exhaust diffuser passage was design in such a way the effective deceleration of flow to occur in the exhaust diffuser and hence low velocity flow at the exit. The total pressure rise of the flow coming out from the exhaust diffuser is shown in FIG. 17(d). This indicates clearly the uniform total pressure at the exhaust of whole stage. There is not much variation in total pressure along the span. This figure also shows the effect of speed combinations. It shows equivalent endwall effects near to both shroud surface and hub surface up, which may be occurring mainly due to growth of boundary layer across the passage.

Effects of Variation of Mass Flow Rate

The effects of variation of mass flow rate were studied by varying normalized mass flow rates for four different values i.e. m=0.7, 0.8, 1.0 and 1.2 for different speed combinations. The streamwise variations of the total pressure rise coefficient for these mass flow rates are shown in FIG. 18 for three speed combinations $N1_d$–$0.93N2_d$, $N1_d$–$N2_d$ and $N1_d$–$1.07N2_d$. At the exit of the stage (FIG. 18 (b)①), it is observed that for the speed combinations $N1_d$–$0.93N2_d$, the maximum total pressure rise coefficient occurs for mass flow rate, m=0.7 and a gradually decreasing total pressure rise coefficient with the increase in mass flow rate. However, for speed combinations, $N1_d$–$N2_d$ and $N1_d$–$1.07N2_d$ maximum pressure rise is occurring for m=0.8 and beyond this gradually decreasing total pressure rise coefficient is observed (FIG. 18 (a) ② and FIG. 18(c) ③).

The rotor-1, as discussed in the earlier section, is not affected by a change in speed combinations. For all speed combinations, the rotor-1 is giving an equivalent performance. In contrast, change in mass flow rate has an impact on the performance of the rotor-1, as shown in FIG. 18. The maximum total pressure rise coefficient for this rotor is produced for mass flow rate, m=0.8. However, for about a streamwise location of 0.75 (FIG. 18(a) ④) maximum total pressure rise coefficient is produced for mass flow rate, m=0.7. Then, it sees a drop in the total pressure rise coefficient, indicating the aerodynamic mismatch between the rotors and flow separation in these regions. Apart from this, the rotor-1 shows a consistent behavior, where for m=0.8, 1.0 and 1.2, the total pressure rise coefficient decreases with an increase in mass flow rate along with the streamwise locations.

The rotor-2 shows maximum total pressure rise coefficient at m=0.8 for all speed combinations and as discussed earlier section, it is increasing with an increase in speed combinations, as shown in FIG. 18. In fact, for mass flow rates m=1.0 and 1.2 as well total pressure rise coefficient is increasing with an increase in speed combinations. Mass flow rate greater than equal to m=0.8, this rotor at the exit shows a consistent behavior where for a particular speed combination, an increase in mass flow rates results in a decrease in total pressure rise. However, the rotor-3, which is a centrifugal compressor, has a stable and wide operating range. Its performance is consistent for all mass flow rates. It is producing maximum pressure rise at m=0.7 for the all speed combinations.

The spanwise i.e. hub to shroud location performance is explored at the exit of each domain for design speed combinations $N1_d$–$N2_d$ for different mass flow rates as shown in FIG. 19. At the exit of the rotor-1 and the rotor-2 of this figure, two flow regions may be distinguished. Regions of flow with endwall effects at both near to shroud about 70-80% of span and near to hub about 5-6% of span. Another region is a core flow region between the regions of flow with endwall effects.

It is observed that with an increase in mass flow rate, the total pressure rise coefficient is decreasing, except m=0.7. Moreover, the core flow span is increasing with the increase in mass flow rate. This is highlighted in FIG. 19 (*a*) ①, where "knee" between core flow and regions of end wall near to shroud is shifting gradually upward. Hence, the endwall effect influence is reducing with an increase in mass flow rate resulted in an enlarged core flow region. There is consistent and progressive growth of this region for m=0.8 to 1.2. However, for m=0.7 drop in total pressure rise near to shroud is more pronounced, indicating flow separation. Similar to the exit of the rotor-1, distinct trends but similar in characteristics can be observed at the exit of the rotor-2 (see FIG. 19 (*b*)). The trends are distinct because of the inlet total pressure profile for the rotor-2 was coming from the rotor-1, which was subject to change in performance, due to a change in mass flow rate. Here as well, other than m=0.7, total pressure rise is decreasing with an increase in mass flow rate and a sharp drop in total pressure rise for m=0.7 is observed.

At the exit of the rotor-3, total pressure rise distribution is non-uniform considering the complex and highly 3-dimensional flow development within the flow passage of the rotor-3, a centrifugal compressor (see FIG. 19 (*c*)). Despite the non-uniformity, one of the distinguishable performance characteristics of this rotor is hub dominant total pressure rise development. This may be due to the prominent endwall effect near to shroud, where it is subjected to tip leakage flow due to a tip clearance of about 7% of exit span. However, a uniform total pressure distribution across span is achieved at the exit of exhaust passage (see FIG. 19 (*d*)). Endwall effects near to both hub and shroud of this passage are developing giving a parabolic shape to the total pressure rise distributions. This may be resulted predominantly due to boundary layer development in the flow passage.

Conclusions from Numerical Studies

The numerical studies are carried to evaluate the performance characteristics with respected to a variation in speed combinations of $N1_d$–$N2_d$, $N1_d$–$0.93N2_d$ and $N1_d$–$1.07N2_d$, where speed combinations are varied by keeping the rotational speed of the rotor-1 constant, and a variation in mass flow rates of 0.7, 0.8, 1.0 and 1.2 times the design mass flow rate. From the detailed analysis of results obtained, the following conclusions may be drawn.

Performance Characteristics of Rotors and Stage
Stable and nearly stall-free operation of the rotor-1 i.e. front rotor of contra-rotating axial compressor within the prescribed ranges of speed combinations and mass flow rates.

The performance of the rotor-2 i.e. rear rotor of contra-rotating axial compressor undergoes changes in total pressure rise coefficients with the change in mass flow rate and speed combinations. The maximum total pressure rise coefficient is occurring about mass flow rate m=0.8 for each speed combinations. This rotor exhibits consistent performance for mass flow rates greater than m=0.8 for all three speed combinations.

The performance characteristics of the overall stage show typical characteristics of a compressor stage. With the decrease in speed combinations operating margin of the compressor is improving.

Effects of Variation of the Speed Combinations
The overall performance of the stage is improving with the increase in speed combinations from $0.93N2_d$ to $1.07N2_d$. The performance of the rotor-2 and the rotor-3 with exhaust passage are contributing mainly to change in this performance.

The rotational speed of the front rotor of contra-rotating axial compressor i.e. the rotor-1 constant. The performance of this rotor remains unhindered by the variation of the rotational speed of other rotors for these speed combinations. Stable operating characteristics of front rotor significant achievement towards the improved design of contra-rotating axial compressors.

Effects of Variation of Mass Flow Rate
The variation of mass flow rates is affecting the performance of each rotor domain leading to the development of typical performance characteristics of the stage. For each speed combinations, a maximum pressure rise is observed for mass flow, generally about m=0.8.

Other than m=0.8, gradually decreasing total pressure rise is occurring, forming a positive and then, a negative slope of variation in total pressure rise. Overall, these performance characteristics are becoming wider with a reduction in speed combinations such that positive slope is not occurring of the stage for speed combinations of $N1_d$–$0.93N2_d$ within the range of prescribed mass flow rates.

Performance of Inter-Stage Connecting Duct
To minimize the overall outer diameter of the axial-centrifugal compressor stage, the outer diameter of the centrifugal compressor need to be minimized, which may have significantly larger diameter than other axial compressor stages. Hence, in this effort, inlet dimension, of centrifugal compressor, which is a direct function of exit dimension, is reduced in comparison to exit dimensions of axial rotors. Now, the flow at the exit of rotor-2 having larger mean diameter need to be directed to inlet of the rotor-3 i.e. centrifugal compressor having smaller mean diameter. An inter-stage connecting duct is employed to achieve this purpose. However, this need to be designed such a way that it need to have minimum total pressure loss along the streamwise location and maximum diffusion of the flow at the discharge as well as producing the desired flow condition at the inlet of the centrifugal compressor.

It is observed that for the given speed combinations in the study at design mass flow rate, the total pressure rise along with streamwise locations of the inter-stage connecting duct changes negligibly. Hence, the overall performance in terms of total pressure rise of the inter-stage connecting duct remains unaffected with the variation of speed.

Similar trends are observed with the variation of mass flow rates for all the given mass flow rates. The overall performance in terms of total pressure rise changes negligibly with the variation of mass flow rates.

Performance of Exhaust Duct

The flow coming out from the centrifugal impeller of the stage is three-dimensional in nature with very high kinetic energy. This flow need to be converted into a uniform flow and the high kinetic energy need to be converted to pressure energy. In order to achieve this in a constraint dimension of exhaust duct, a drop in total pressure rise along the streamwise locations is occurring for all given speed combinations and mass flow rates. However, a uniform total pressure rise is achieved at the exit of exhaust duct.

We claim:

1. An axial centrifugal contra rotating light weight and compact compressor configuration suitable for any working fluid based systems selectively including a compressor system with air/gas as the working fluid and a pumping system with any liquid as the working fluid comprising:
   an axial-centrifugal contra-rotating compressor configuration with at least one back end centrifugal compressor stage;
   said axial-centrifugal contra-rotating compressor configuration comprises:
      at least a twin-spool configuration comprising of at least two rotor blading assemblies, wherein a first rotor blading assembly rotates in the direction opposite to a second rotor blading assembly, and
      at least one low-pressure (LP) rotor blading assembly comprising of at least one axial rotor, and at least one high-pressure (HP) rotor blading assembly, comprising of at least two rotors including one axial rotor and one centrifugal rotor;
   a flow passage comprising an inter-stage connecting duct between an axial and a centrifugal compressors; and
   an exhaust diffuser passage of the centrifugal compressors with an axial exit;
   said compressor system include a multistage, gas turbine-driven or motor-driven system.

2. The axial-centrifugal contra rotating light weight and compact compressor configuration suitable for any working fluid based systems as claimed in claim 1,
   wherein said inter-stage connecting duct comprises an annular shaped duct having a mean inlet diameter (exit of contra-rotating stage) greater than a mean discharge diameter (entry of centrifugal compressor), said inter-stage connecting duct between the axial and the centrifugal compressors comprises of an annular duct of S-shaped having an inlet radii, greater than an exit radii, wherein the inlet radii is the radius of a hub and a shroud.

3. The axial-centrifugal contra rotating light weight and compact compressor configuration suitable for any working fluid based systems as claimed in claim 2.
   wherein said exhaust diffuser passage of the centrifugal compressors including a radial to axial turning annular passage at the exit of the centrifugal impeller rotor-3 to minimize the overall outer dimension where after the passage is directed to either purely an axial direction or inclined to an axial direction by a small angle in the range of up to 10° to 15° as a curved shape discharge diffuser.

4. The axial-centrifugal contra rotating light weight and compact compressor configuration suitable for any working fluid based systems as claimed in claim 1,
   wherein said exhaust diffuser passage of centrifugal compressors includes a radial to axial turning annular passage at the exit of the centrifugal impeller rotor-3 to minimize an overall outer dimension where after the passage is directed to either purely an axial direction or inclined to an axial direction by a small angle in the range of up to 10° to 15° as a curved shape discharge diffuser.

5. The axial-centrifugal contra rotating light weight and compact compressor configuration suitable for any working fluid based systems as claimed in claims 1, wherein said axial-centrifugal contra-rotating compressor include contra-rotating axial compressor blade comprising low-aspect ratio blades, wherein the aspect ratios involving the ratio of the height of the blade to the chord length of the blade, for both blades, are in the range of 0.7 to 1.5 and wherein said axial stages are free of stator blades.

6. The axial-centrifugal contra rotating light weight and compact compressor configuration suitable for any working fluid based systems as claimed in claim 5, wherein said contra-rotating axial compressor blade comprises low-aspect ratio blades wherein the aspect ratios involving the ratio of the height of the blade to the chord length of the blade, for both blades, are in the range of 0.7 to 1.5 and said contra-rotating axial compressor blade comprises blade sections being of an aerofoil shaped profile.

7. The axial-centrifugal contra rotating light weight and compact compressor configuration suitable for any working fluid based systems as claimed in claims 1, wherein said axial-centrifugal contra-rotating compressor include a contra-rotating axial compressor blade comprising blade sections being of an aerofoil shaped profile.

8. The axial-centrifugal contra rotating light weight and compact compressor configuration suitable for any working fluid based systems as claimed in claims 1, comprising selective speed combination of the two spools wherein the low-pressure (LP) rotor blading assembly comprising the axial rotor is rotatable at a lower speed while the high-pressure (HP) rotor blading assembly comprising of the axial rotor and the centrifugal rotor is rotatable at a higher speed.

9. The axial-centrifugal contra rotating light weight and compact compressor configuration suitable for any working fluid based system as claimed in claim 8, comprising an axial compressor (rotor-1) mounted on a front rotor-shaft/LP turbine spool rotating with a rotational speed (N1); and
   an axial compressor (rotor-2) and a centrifugal impeller/compressor (rotor-3) both mounted on a rear rotor-shaft/HP turbine spool and hence, rotating at equal speed (N2) and wherein the speed ratios (N2/N1) is of a magnitude greater than 1.

10. The axial-centrifugal contra rotating light weight and compact compressor configuration suitable for any working fluid based systems as claimed in claims 1, wherein the low-pressure (LP) rotor blading assembly comprising of the at least one axial rotor and high-pressure (HP) rotor blading assembly comprising of the at least two rotors including the axial rotor and the centrifugal rotor are operable selectively involving:
   (i) co-axial twin spools with the axis of rotation of LP spool being coaxial to the axis of rotation of HP spool; and
   (ii) parallel twin spools wherein the axis of rotation of LP spool is parallel to the axis of rotation of the HP spool.

11. The axial-centrifugal contra rotating light weight and compact compressor configuration suitable for any working fluid based systems as claimed in claims 1, wherein said low-pressure (LP) rotor ng assembl having a LP spool and said high-pressure rotor blading assembly having HP spool include rotor blade assemblies which are housed between a spool hub and an outer casing thereof, said rotor blade assemblies including rotor blades being selectively extending outwardly from the said hub and having a tip clearance of gap between the blade tip and said casing and/or mounted on the said casing to extend radially inward from the said casing with a tip clearance or a gap between the blade tip of such rotors and the hub of the compressor stage.

12. The axial-centrifugal contra rotating light weight and compact compressor configuration suitable for any working fluid based systems as claimed in claim 11, wherein the tip clearance range for the LP and HP axial rotor blades is in the range of 0.5% to 1.0% of span of the blade & Centrifugal rotor the tip clearance in the range of 0.5 to 1% of blade height at inlet and 0.5% to 2.0% of blade width at the exit.

13. The axial-centrifugal contra rotating light weight and compact compressor configuration suitable for any working fluid based systems as claimed in claims 1, including compressor stage adapted for a turboprop aero-engine comprising:
  a. a propeller fan with or without a cooperating gear box unit connected with the LP turbine spool and is rotatable at a lower speed;
  b. co-axial twin-spools, the axis of rotation of the LP turbine spool being co-axial to the axis of rotation of HP turbine spool;
  c. all rotor blades extending radially outward from a hub with a tip clearance or a gap between the blade tip of all rotors and casing of the compressor stage.

14. The axial-centrifugal contra rotating light weight and compact compressor configuration suitable for any working fluid based systems as claimed in claims 1, including the compressor stage adapted for a turbofan aero-engine comprising:
  a. a front fan with or without a gear box unit operatively connected with the LP turbine spool and is rotatable at a lower speed;
  b. said compressor stage receiving a part of air passing through the front fan, the remaining part of the air is passaged through an annular space radially outside of the compressor stage, a bypass duct;
  c. a stator or strut arrangement at forward potion the compressor stage to direct the flow to the bypass duct and the compressor stage;
  d. co-axial twin-spools with the axis of rotation of the LP turbine spool being co-axial to the axis of rotation of HP turbine spool;
  e. all rotor blades extending radially outward from hub with a tip clearance or gap between the blade tip of all rotors and casing of the compressor stage.

15. The axial-centrifugal contra rotating light weight and compact compressor configuration suitable for any working fluid based systems as claimed in claims 1, including the compressor stage adapted for Auxiliary Power Units (APUs) of an aircraft and other compressor and pump applications comprising:
  a. a volute inlet plenum to deliver fluid to the compressor as an intake duct having an opening to annular shaped axial fluid flow passage at discharge;
  b. a LP turbine spool with or without a connected gearbox at forward potions of the compressor to transmit power, in particular, to fulfill auxiliary power requirements of the aircrafts;
  c. co-axial twin-spools with the axis of rotation of the LP turbine spool being co-axial to the axis of rotation of HP turbine spool;
  d. all rotor blades extending radially outward from a hub with a tip clearance or a gap between the blade tip of all rotors and casing of the compressor stage.

16. The axial-centrifugal contra rotating light weight and compact compressor configuration suitable for any working fluid based systems as claimed in claims 1, including the compressor stage configuration comprising:
  a. a First rotor blade row or LP compressor blade row mounted on the rotating casing whereby power is transmitted to the LP compressor blade row from a LP turbine spool through the rotating casing;
  b. a First rotor blade row or LP compressor blade row extending radially inward from casing for this configuration with a tip clearance or a gap between the blade tip of these rotors and hub of the compressor stage;
  c. a second rotor blade row or HP compressor blade row extending radially outward from a hub with a tip clearance or a gap between the blade tip of these rotors and casing of the compressor stage;
  d. parallel twin-spools with the axis of rotation of LP turbine spool is parallel to the axis of rotation of HP turbine spool.

17. The axial-centrifugal contra rotating light weight and compact compressor configuration suitable for any working fluid based systems as claimed in claims 1, including the compressor stage configuration comprising:
  a. a volute inlet plenum to deliver fluid to the compressor as an intake duct having an opening to an annular shaped axial fluid flow passage at discharge;
  b. a First rotor blade row or LP compressor blade row mounted on the rotating casing whereby power is transmitted to the LP compressor blade row from the LP turbine spool through the rotating casing;
  c. a First rotor blade row or LP compressor blade row extending radially inward from casing with a tip clearance or a gap between the blade tip of these rotors and hub of the compressor stage;
  d. a Second rotor blade row or HP compressor blade row extending radially outward from a hub with a tip clearance or a gap between the blade tip of these rotors and casing of the compressor stage;
  e. parallel twin-spools with the axis of rotation of the LP turbine spool being parallel to the axis of rotation of the HP turbine spool.

18. The axial-centrifugal contra rotating light weight and compact compressor configuration suitable for any working fluid based systems as claimed in claims 1, including the compressor stage configuration comprising:
  a. a volute inlet plenum to deliver a fluid to the compressor as an intake duct having an opening to an annular shaped axial fluid flow passage at a discharge;
  b. a First rotor blade row or LP compressor blade row mounted on the rotating casing whereby power is transmitted to the LP compressor blade row from the LP turbine spool through the rotating casing;
  c. one rotor at forward portion of the LP compressor blade row being a power-transmitting member to the whole LP compressor blade row whereby the rotor transmits power to other rotors of the LP compressor blade row through the rotating casing and wherein the rotor is a shrouded rotor and free of required tip clearance or gap between both either casing or hub;
  d. other than one rotor at forward portion, remaining rotors of the First rotor blade row or LP compressor blade row extending radially inward from a casing with a tip clearance or a gap between the blade tip of these rotors and a hub of the compressor stage;
  e. a Second rotor blade row or HP compressor blade row extending radially outward from the hub with the tip clearance or gap between the blade tip of these rotors and casing of the compressor stage;
f. the LP turbine spool optionally connected to a gearbox at forward potions of compressor to transmit power;
g. co-axial twin-spools with the axis of rotation of the LP turbine spool being co-axial to the axis of rotation of HP turbine spool.

\* \* \* \* \*